United States Patent [19]

Murakami

[11] Patent Number: 4,594,930

[45] Date of Patent: Jun. 17, 1986

[54] APPARATUS FOR SYNCHRONIZING PLAYBACK RATES OF MUSIC SOURCES

[76] Inventor: Naoyuki Murakami, 2-12-2-704, Kyuden, Setagaya-ku, Tokyo, Japan

[21] Appl. No.: 608,214

[22] Filed: May 8, 1984

[30] Foreign Application Priority Data

May 10, 1983 [JP] Japan ................................ 58-81287

[51] Int. Cl.[4] ........................ G10H 1/40; G10H 3/09; G11B 31/02

[52] U.S. Cl. ........................................ 84/1.02; 84/1.03; 84/1.28; 84/DIG. 29

[58] Field of Search ...................... 84/1.02, 1.03, 1.28, 84/462, 470 R, 477 R, 478, DIG. 29

[56] References Cited

U.S. PATENT DOCUMENTS 4,344,344 8/1982 Nakada et al. ........................ 84/1.03
4,378,720 4/1983 Nakada et al. ........................ 84/1.03
4,402,244 9/1983 Nakada et al. ........................ 84/1.03
4,419,918 12/1983 Dyck et al. .......................... 84/1.03
4,432,266 2/1984 Nakada ................................ 84/1.03
4,484,507 11/1984 Nakada et al. ........................ 84/1.03
4,506,580 3/1985 Koike .............................. 84/1.28 X

*Primary Examiner*—S. J. Witkowski
*Attorney, Agent, or Firm*—Birch, Stewart, Kolasch & Birch

[57] ABSTRACT

Apparatus for synchronizing playback rates of a plurality of music sources includes a reference generator generating a reference signal including beats, a music source producing a music signal representative of music, a discriminating circuit operative in response to the music signal for extracting beats involved in the music signal to produce a beat signal representative of the extracted beats, and control circuitry interconnected to the reference generator and music source for determining the time difference between the occurrence of beats involved in the reference signal and the occurrence of the beat signal to regulate the music source so as to make the time difference substantially constant. The music source will thereby produce the music signal with a phase difference of the beats involved in the music signal substantially constant with respect to the beats involved in the reference signal.

24 Claims, 8 Drawing Figures

APPARATUS FOR SYNCHRONIZING PLAYBACK RATES OF MUSIC SOURCES

BACKGROUD OF THE INVENTION

1. Field of the Invention

The present invention relates to a control apparatus for music sources, and particularly to an apparatus for synchronizing the playback rates of a plurality of music sources, such as phonographic disk players or tape players.

2. Description of the Prior Art

When two music sources, such as phonographic record players, are in operation, it is sometimes necessary to synchronize the playback rates of both music sources. While the synchronization is established between the playback rates of each source, switching is facilitated between the outputs from both sources without including distinct or noticeable discontinuities in their outputs.

Conventionally, in a recording studio in which two disk players are provided, manual control was made for synchronizing one of the players, for instance, a slave player, with the other player such as master player, so that two pieces of music are reproduced at the same rate of speed, or tempo. Such manual control was, however, very difficult to set up with a high degree accuracy because of the high auditory sensitivity of human beings to two sounds running concurrently.

SUMMARY OF THE INVENTION

It is therefore an object of the present invention to provide an apparatus for synchronizing the playback rates of a plurality of music sources in which automatic synchronization is established between a plurality of music sources without complicated manual operations.

In accordance with the present invention, the apparatus for synchronizing the playback rates of a plurality of music sources includes a reference generating device for generating a reference signal including beats representative of a desired tempo, a first music reproducing device controllable in the playback rate for producing a music signal representative of music, wherein the music signal is recorded on either of a phonographic disk or tape in the form of analog waveforms, a first discriminating device operative in response to the music signal for extracting the beat involved in the music signal to produce a beat signal representative of the extracted beat, and a control device introconnected to the reference generating device, the first music reproducing device, and the first discriminating means for determining a time difference between the occurrence of beats involved in the reference signal and the occurrence of the beat signal in order to regulate a playback rate of the first music-reproducing device so as to make the time difference therebetween substantially constant, the first music reproducing device produces the music signal with a phase difference between the beats involved in the music signal which is substantially constant with respect to the beats involved in the reference signal.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
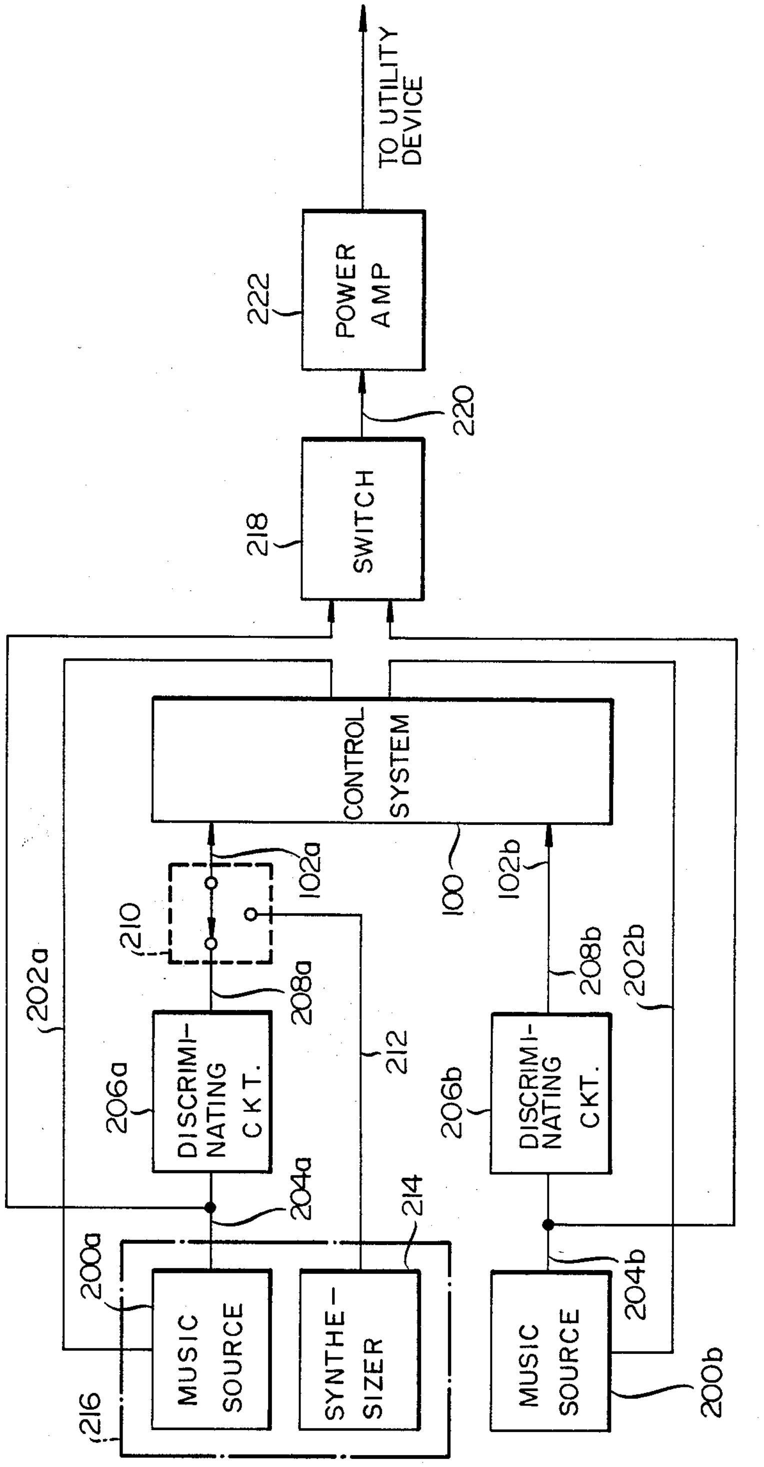
FIG. 1 shows, in a schematic block diagram, a fundamental system configuration of a preferred embodiment of an apparatus for synchronizing the playback rates of a plurality of music sources in accordance with the present invention.

With reference to FIG. 1, an embodiment of an apparatus for synchronizing the playback rates of a plurality of music sources in accordance with the present invention includes a control system 100 which controls playback rates of a pair of music sources 200*a* and 200*b* by way of control leads 202*a* and 202*b*, respectively. Music sources 202*a* and 202*b* may comprise a music reproducing device, such as a phonographic disk player or tape player, of which the playback rate is controllable in response to the control signals developed from control system 100.

The signals representative of music sound are produced on leads 204*a* and 204*b* from music sources 200*a* and 200*b*, respectively, and provided to associated discriminating circuits 206*a* and 206*b*. Discriminating circuits 206*a* and 206*b* are the circuitry which serves to distinguish or extract the signals which are in most cases in the form of pulses or impulses representative of beats involved in the music signals supplied thereto an associated one of the music sources 200*a* and 200*b*. Discriminating circuits 206*a* and 206*b* may preferably be low-pass filters to produce signals which may be indicative of the thus separated beats on respective output leads 208*a* and 208*b*.

The signals on connection 208*a* are fed to an input port 102*a* to control system 100 via switch 210, as depicted in the FIG. 1. In the illustrative embodiment, switch 210 is an alternative selector device which transfers selectively either one of the signals supplied to input terminals 208*a* and 212 to output terminal 102*a*. Switch 210 has output terminal 212 connected to a synthesizer 214, which may produce signals indicative of musical sound, or more particularly distinct beat signals, on lead 212. Synthesizer 214 and music source 200*a* constitute a reference beat signal generating unit 216 functioning as producing reference or "master" beat signals. The signals on connection 208*b* are fed to another input port 102*b* and to the control system 100.

Control system 100 operates on the signals provided on input ports 102*a* and 102*b* to determine a time interval or difference between a master beat signal originating from reference beat signal generator unit 216 and a successive "slave" beat signal originating from music source 200*b*.

While switch 210 connects terminal 208*a* to terminal 102*a*, the control signals will be developed on output ports 202*a* and 202*b* from control system 100 to regulate the playback rates of music sources 200*a* and 200*b* so as to cause the thus determined time difference to be kept substantially constant, involving no significant changes and fluctuations. In other words, control will be made so as to run both music sources 200*a* and 200*b* with a constant phase difference established between the beats contained in the music signals reproduced therefrom.

While switch 210 connects terminal 208*b* to terminal 102*a*, the control signals will be developed on output port 202*b* from control system 100 to regulate the playback rate of music source 200*b* so as to cause the thus determined time difference to be kept substantially constant, involving no signifciant changes and fluctuations. In other words, control will be made so as to run music source 200*b* in synchronism with the reference beats involved in the signals produced from synthesizer 214, with a constant phase difference of the beats contained in the music signals produced therefrom with respect to the reference beats.

Outputs 204*a* and 204*b* from music sources 200*a* and 200*b*, respectively, are also interconnected to input terminals of a switch 218, which transfers selectively either one of the music signals conveyed over leads 204*a* and 204*b* to its output terminal 220. The music signals appearing on lead 220 is fed via power amplifier 222 to a utility device, such as a loudspeader, tape recorder, or transmission facilities, etc. Both of switches 210 and 218 may be a manually operable switch, or, alternatively, switching electronics having connecting states controllable in response to control system 100 pursuant to commands entered therein by means of manual input means, for example.

Figure 2:
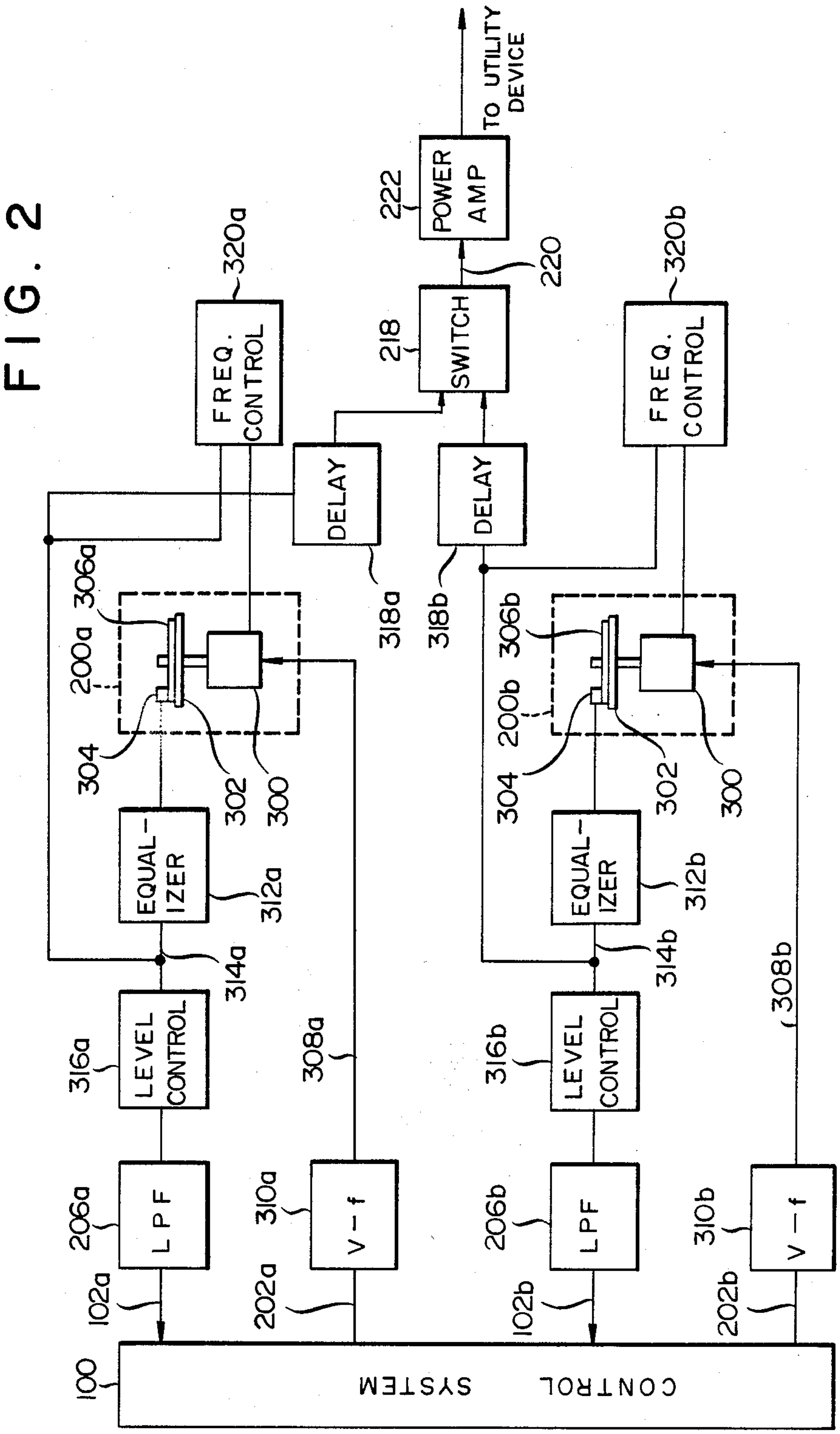
FIG. 2 is a schematic block diagram showing a preferred embodiment of the apparatus in accordance with the present invention.

With reference to FIG. 2, another embodiment of the present invention includes phonographic disk players 200*a* and 200*b*, each of which comprises a direct-drive motor 300, a turntable 302 and a pickup 304. Direct-drive motors 300 are controllable in speed or rate of revolution in response to frequency signals carried over lines 308*a* and 308*b*, respectively, which signals are produced by voltage-to-frequency converters 310*a* and 310*b* under the control of control system 100. On turntables 302, phonographic records or disks 306*a* and 306*b*, respectively may be supported to rotate together with turntables 302. The acoustic signals recorded on disks 306*a* and 306*b* will be sensed by pickups 304 into equalizer amplifiers 312*a* and 312*b*, respectively. It is to be noted that, in the figures, similar components or structural elements are designated by the same reference numerals, and redundant description will be avoided for simplicity.

The signals produced on output leads 314*a* and 314*b* are connected to level controls 316*a* and 316*b*, respectively, on one hand, and to delay circuits 318*a* and 318*b*, respectively, on the other hand. Level controls 316*a* and 316*b* automatically control or restrict the level of the sound signals to provide the resultant signals to pulse shapers, which may advantageously be low-pass filters (LPF) 206*a* and 206*b*, respectively, functioning as discriminating beat signals from the sound signals, as discussed with reference to FIG. 1.

Delay circuits 318*a* and 318*b* are circuitry for delaying the sound signals received by a preset or predetermined period of time to produce the resultant signals to switch 218. The amount of delay may manually be set in delay circuits 318*a* and 318*b* independently of each other, and/or may be adjustable under the control of control system 100. Delay circuits 318*a* and 318*b* serve as a fine control over the relationship between the phases of the music signals reproduced from disks 306*a* and 306*b*. Delay circuits 318*a* and 318*b* may be omitted, or the amount of delay time may be adjustable to zero.

The rotary speed of motors 300 are sensed by frequency controls 320*a* and 320*b*, respectively, so as to modify the frequencies of the music signals reproduced from disks 306*a* and 306*b*.

Figure 3:
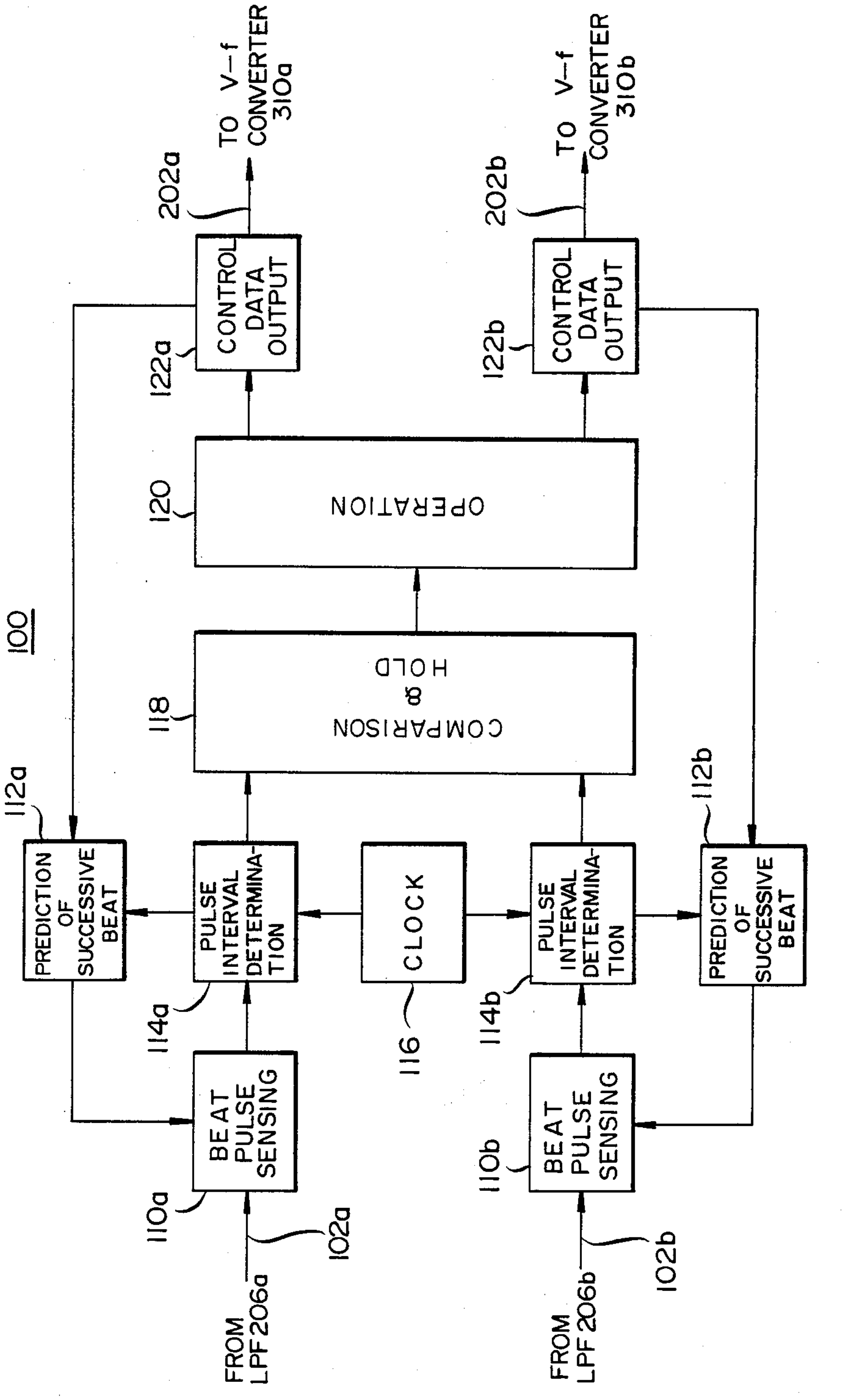
FIG. 3 shows, in a schematic block diagram, the structural features of the control system involved in the embodiment shown in FIG. 2.

Referring to FIG. 3, control system 100 may preferably be constituted by the functional blocks or units, which are useful for understanding the operations of the illustrative embodiment. From low-pass filters 206*a* and 206*b*, the signals passing those filters are sensed by functional blocks 102*a* and 102*b*, respectively, to be fed into system the 100.

As well known in the art, the strongest beat, usually the first beat, involved in the respective measures forming a piece of music occurs periodically, or appears repeatedly at constant time intervals determined by the tempo at which the piece is played appropriately, so that the occurrence of a successive strongest beat will be predictable within a certain allowance so long as the piece is played naturally. The occurrence of a succeeding strongest beat will therefore be "significant" if it is involved in a predicted range of allowance, during which the succeeding strongest beat may be received. The boxes 110*a* and 110*b* of beat pulse sensing are provided with data representing such a predicted range of allowance from prediction boxes 112*a* and 112*b*, respectively.

Sensing blocks 110*a* and 110*b* produce beat signals to blocks 114*a* and 114*b* which determine a time interval between the preceding strongest beat pulse and the presently received strongest beat pulse, i.e. a time interval between adjacent ones of the strongest beat pulses in the time axis, only when they have sensed the received beat pulse during the predicted period of time provided thereto from prediction boxes 112*a* and 112*b*, respectively. In this specification, a beat pulse sensed by sensing blocks 110*a* and 110*b* in the manner described above is referred to as "significant" beat pulse. Pulse interval determining blocks 114*a* and 114*b* are adapted to determine, in response to clocks provided from a clock generator 116, a time interval from the time the preceding strongest beat pulse was received to the time the strongest beat pulse immediately following the preceding strongest beat pulse was received.

The time intervals thus determined by blocks 114*a* and 114*b* are supplied to blocks 112*a* and 112*b* to predict a successive beat, respectively, on one hand, and to a comparison and hold unit 180, on the other hand. Prediction blocks 112*a* and 112*b* predict, from a mean value of the time intervals together with speed control data fed from control data outputs 122*a* and 122*b*, respectively, a period of time while a succeeding significant beat pulse is expected to occur, to provide associated sensing units 110*a* and 110*b* with the data representative of the predicted time period. A comparison and hold unit 118 determines the time difference between both of the time intervals measured by blocks 114*a* and 114*b* to hold therein the resultant data indicative of the thus determined difference until the next time difference is determined with respect to significant beat pulses received following the presently received significant beat pulses.

The thus held data is supplied to an operation unit 120, which in turn calculates data representing modifications on the revolutionary rates of motor 300 of at least one (slave) of music sources 200*a* and 200*b*. The calculation is performed so as to minimize the variations or fluctuations in time between the two successive time differences obtained with respect to the preceding significant beat pulses and the presently received significant beat pulses from music sources 200*a* and 200*b*.

The thus calculated, resultant data will be provided to either one of control data output units 122*a* and 122*b*. When music source 200*a* is in the reference state, or the "master" state, and music source 200*b* is in the following state, or the "slave" state, namely, music source 200*b* is controlled so as to follow or "be synchronized with" music source 200*a*, then the speed control data for modification will be produced from operation unit 120 to data output 122*b*, which is involved in the slave state in this instance. When music source 200*b* is in its master state with music source 200*a* in its slave state, the modifying data will be produced from operation unit 120 to data output 122*a*.

In this context, the word "synchronize" is used to run a plurality of music sources with phase differences between two adjacent ones of the beats provided from master and slave music sources kept substantially constant, not necessarily zero, with respect to the time axis. In other words, music signals are resultantly produced from a plurality of music sources at the same rate as the beats involved therein, regardless of whether or not a substantial phase difference exists therebetween.

The control data thus produced is fed to associated one of voltage-to-frequency converters 310*a* and 310*b*, on one hand, and also fed to associated one of prediction units 112*a* and 112*b* to successively be used for the succeeding significant beat prediction described before.

Figure 4:
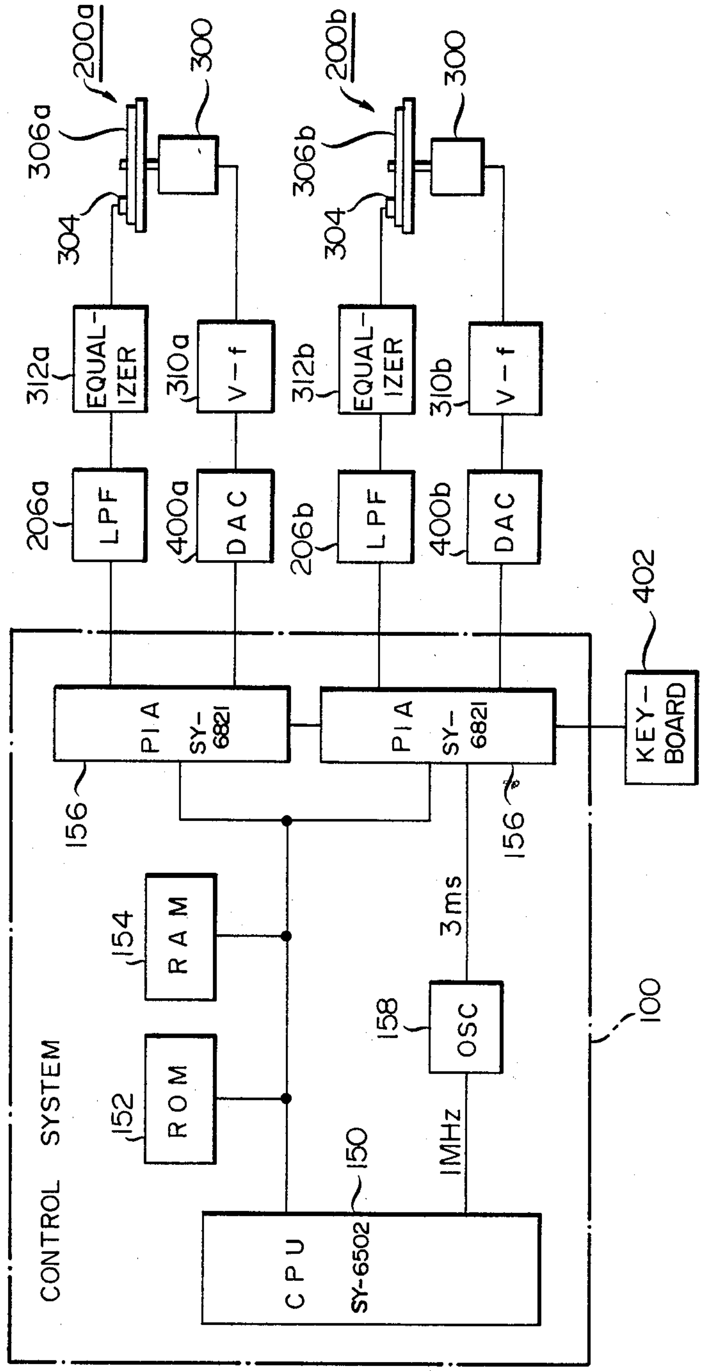
FIG. 4 is a schematic block diagram depicting an embodiment of the present invention implemented by a microprocessor system.

Control system 100 may advantageously be implemented by a processor system, such as a microcomputer, as depicted in FIG. 4. The control system 100 in this illustrative embodiment includes a central processor unit (CPU) 150, Model SY-6502 in this instance, a read-only memory (ROM) 152 in which control program sequences and data are stored, a random access memory (RAM) 154 in which data and program sequences are temporarily stored, and two input and output (I/O) ports (PIA) 156, Model SY-6821 in this instance, which are interconnected with low-pass filters 206*a*, 206*b* and digital-to-analog converters (DAC) 400*a*, 400*b*. Digital-to-analog converters 400*a* and 400*b* are respectively interconnected to voltage-to-frequency converters 310*a* and 310*b*.

In the illustrative embodiment, control system 100 includes a reference oscillator 158, which produces one-megahertz clocks to CPU 150 and interruptions with 3-millisecond intervals to I/O port 156. To one of the input and output ports 156, is connected a keyboard 402, by means of which commands and data may be entered by manual operations. Keyboard 402 may be used for controlling the connecting states of switches 210 and 218.

Figure 5:
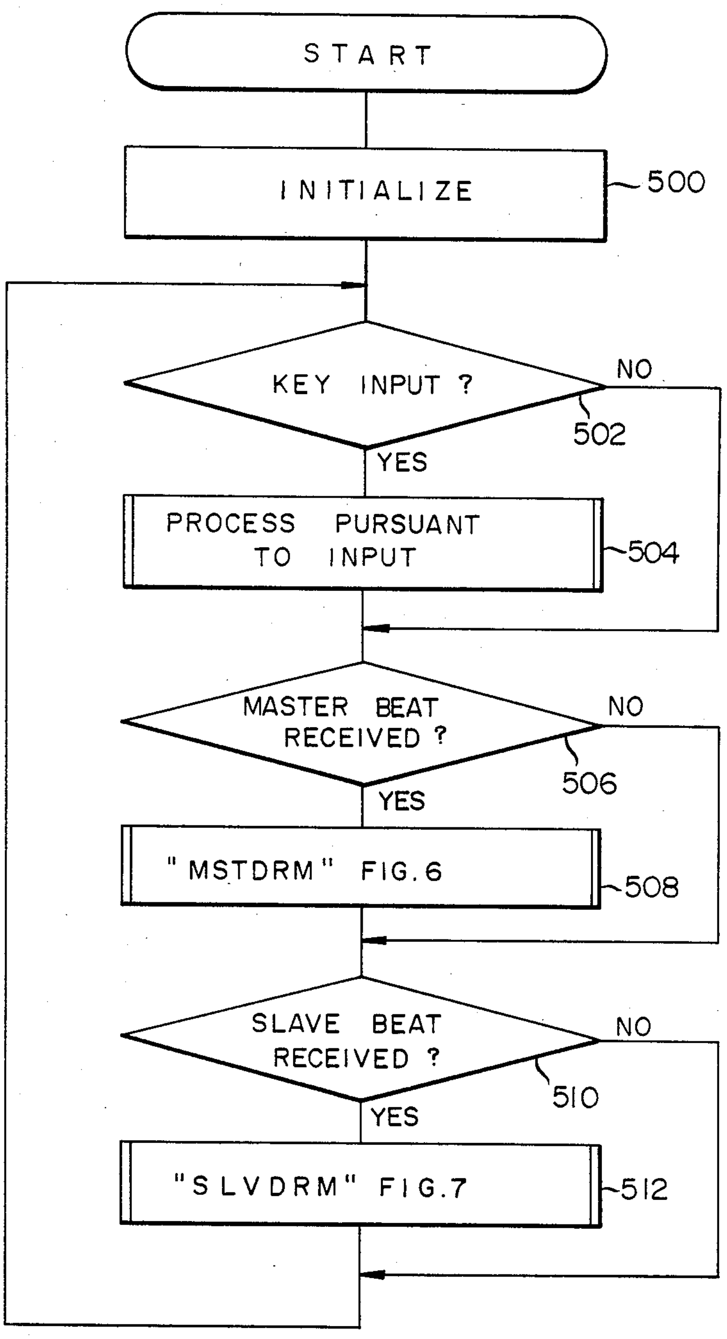
FIGS. 5 through 8 show an example of control flows executed by the processor system involved in the embodiment shown in FIG. 4.

The control program sequences are executed by CPU 150 in accordance with the flow charts shown in FIGS. 5 through 8. The steps shown in FIG. 5 are involved in the main routine, which is performed in response to the RESET command entered by keyboard 402. The FIG. 5 routine scans key inputs to execute the processings in accordance therewith, steps 500 to 504, and also scans beat signal inputs to execute the routines MSTDRM and SLVDRM for regulating the rotary speed of the slave music source to match it to that of the master source, steps 506 to 512.

Figure 6:
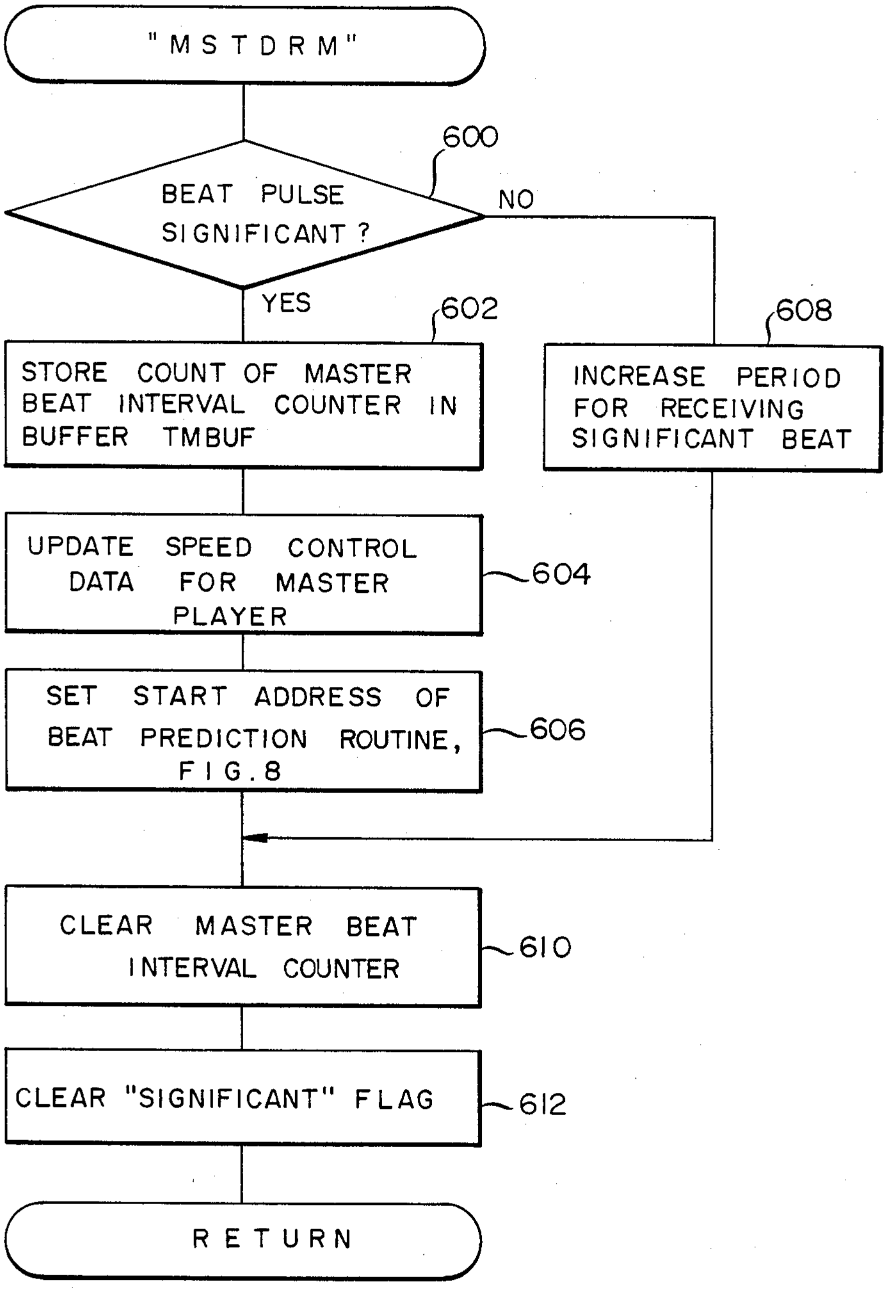

The routine MSTDRM directed to the master player, FIG. 6, performs the processings for sensing a significant beat pulse to count the time interval thereof from the immediately preceding one with respect to the music signals provided from the master player, steps 600 and 602. Unless a significant beat pulse is sensed, the period of time, or "window" for sensing beat pulses presently set will be slightly enlarged or widened, step 608. Then the control data for the master player is updated, step 604, and, thereafter, the prediction operations are prepared, steps 606 through 612. It is to be noted that the prediction is performed in response to clock interruptions for beat interval counting, shown and discussed later in detail with reference to FIG. 8.

Figure 7:
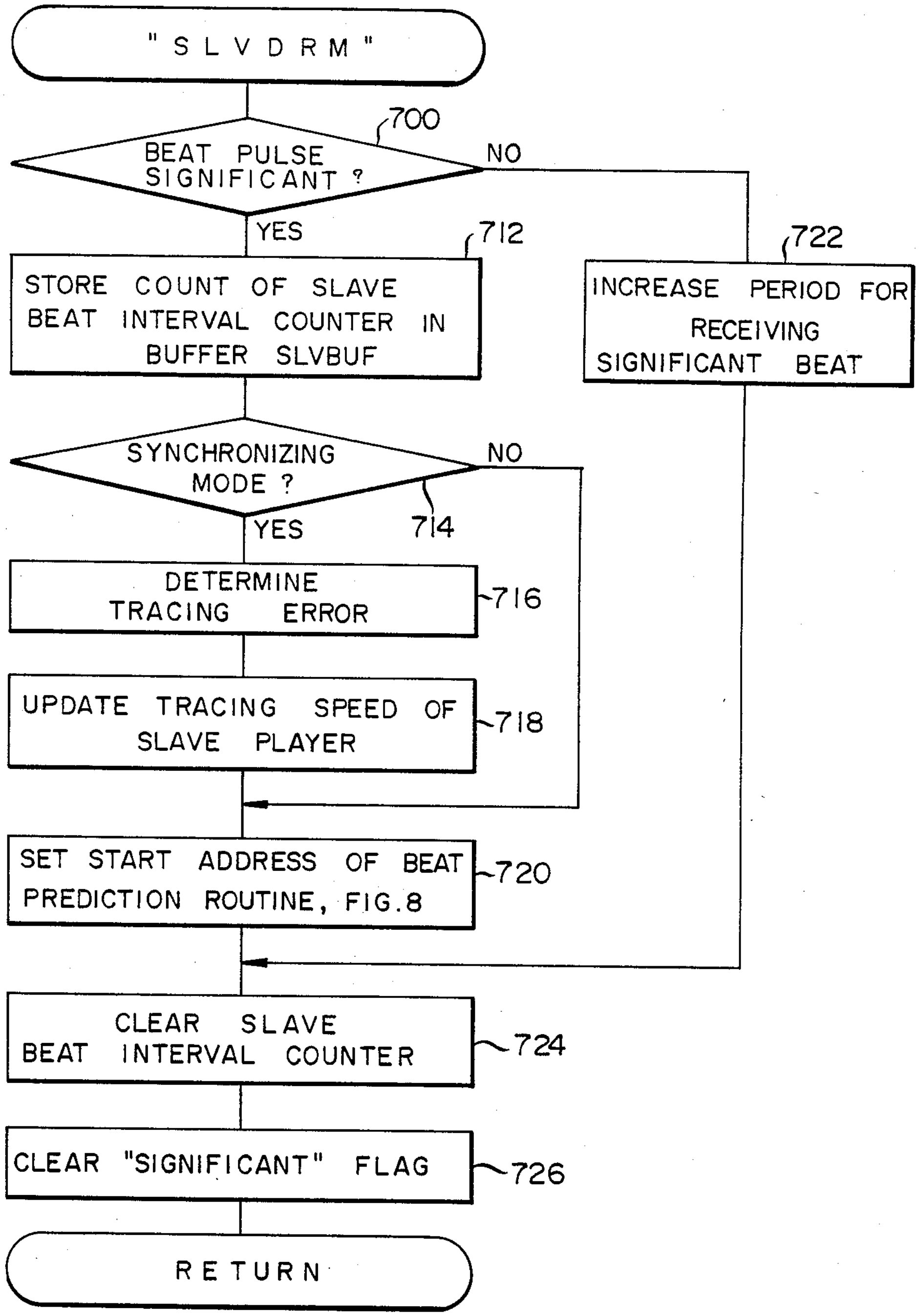

In the routine SLVDRM, FIG. 7, whenever a significant slave beat pulse is sensed, updating of the speed control data for the motor of the slave player will be accomplished if the operational mode is selected to be the synchronous mode, steps 700 to 718.

In the synchronous mode, the slave player is controlled to follow or trace the master player so as to make the time difference between the significant beats of the music signals reproduced from a disk played back by the master player and the significant beats of the music signals reproduced from a disk played back by the slave player substantially unchanged. This means that, in the synchronizing mode of operation, the significant beats contained in the music signals provided from a disk on the slave player, i.e. slave beats, follow or trace the significant beats contained in the music signals provided from a disk on the master player, i.e. master beats, with a substantially constant phase difference kept therebetween.

The calculation or determination of fluctuations in time between the two successive time differences obtained with respect to a preceding significant beat pulse obtained from one of the master and slave music sources and a presently received significant beat pulse obtained from the other source is accomplished to update the speed control data for the master player in the event of so intended instructions provided by keyboard 402, step 604. In the event of no modification instruction, the rotating velocity of the motor of the master player will be kept unchanged. In this embodiment, data D0 for modifying the revolutionary rate of the motor of the master player is expressed in the following expression:

$$D0 = -(128/P)[(D1 - D2) + D1/I],$$

where D1 represents a time difference between the present master and slave significant beat pulses, D2 a time difference thus obtained and held with respect to the preceding significant beat pulses, P a correcting coefficient, I a sum of the time differences during a predetermined length of the preceding period of time, which may preferably be equal to a time period including several significant beats.

Thereafter, the prediction operations are prepared, steps 720 through 726. It is to be noted that this prediction is also performed in response to clock interruptions for counting significant beat intervals, shown in FIG. 8.

Figure 8:
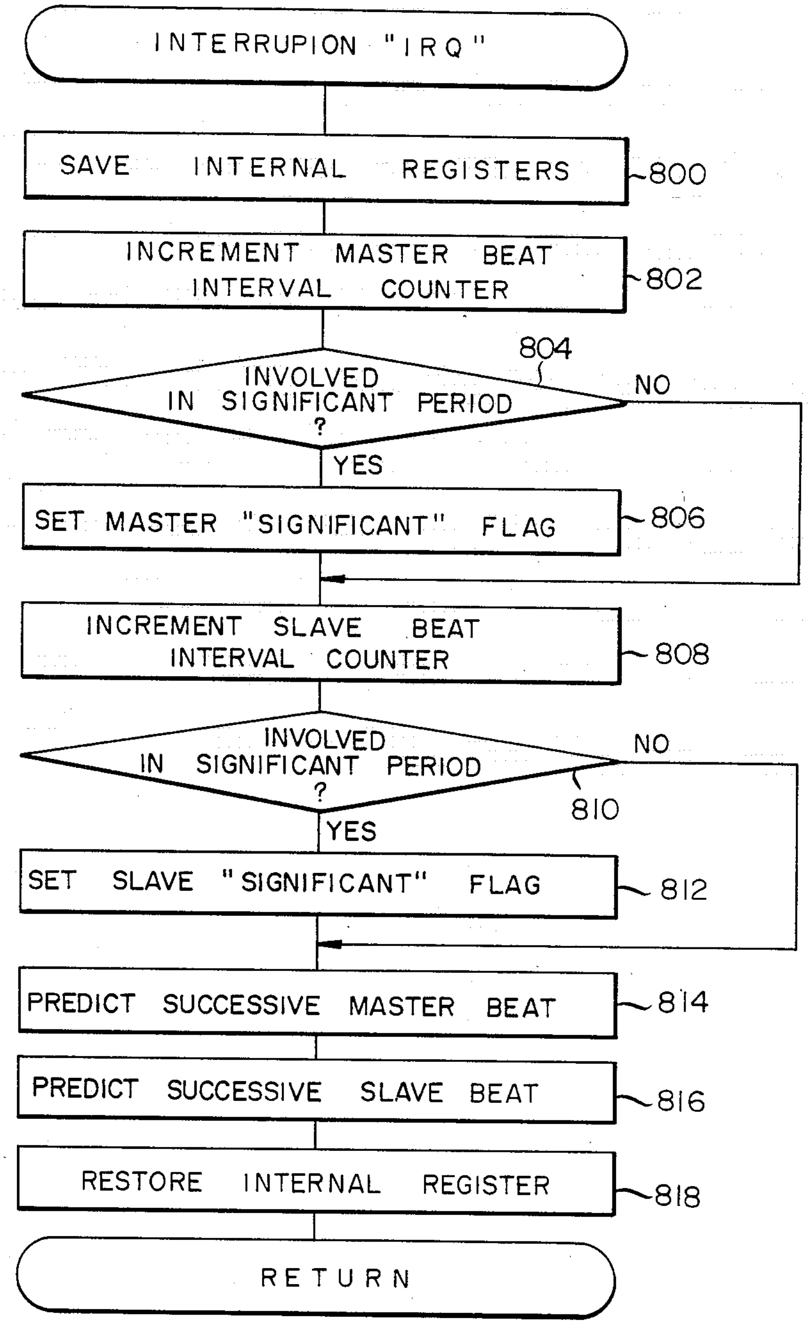

Upon a three-millisecond interruption occurring, the interruption IRQ will start, as shown in FIG. 8. Whenever the master and slave beat pulses are received during the significant ranges of period previously predicted, in other words, the master and slave beat pulses are received within the expected periods of time, steps 800 through 812, a period of time for receiving successive, possible master beat pulse, as well as a period of time for receiving successive, possible slave beat pulse are estimated by means of a mean value of the time intervals determined with respect to the previously received master and slave beat pulses, together with the speed control data ultimately produced from control system 100, steps 814 and 816.

The control data thus produced is added to the present data for presently regulating the rotating speed of the slave motor, the resultant data being in turn fed to associated one of the voltage-to-frequency converters 310*a* and 310*b* via digital-to-analog converters 400*a* and 400*b* ultimately in the form of analog voltage signals.

In this manner, control system 100 produces the resultant data which is used for controlling the rotation speed of motor 300 of at least one slave of the disk players 200*a* and 200*b* to cause the time difference between the significant beats of the music signals reproduced from disk 306*a* and the significant beats of the music signals reproduced from disk 306*b* to be kept substantially constant. The rotating speed of the slave motor will gradually, or slightly step by step, be modified without effecting radical changes appearing generally, namely, the rotating speed will generally appear significantly unchanged.

In accordance with the illustrative embodiments, a piece of music played back on the master player may be joined to any portion of a piece of music played back on the master player without causing unnatural connecting points to be sensed by the human auditory sense. It will therefore be possible to insert an arbitrary portion of a piece of music into an arbitrary portion of another piece of music. It will also be possible to reproduce a piece of music in synchronism with reference beats provided by a synthesizer. The control system may advantageously be adapted to regulate the playback rates of three or more music sources in synchronism with each other.

A comprehensive program for the form of control system 100 as illustrated in FIG. 4 is set forth hereinafter. This particular program provides the synchronizing operations on the slave disk player in response to the master disk player in accordance with the flow steps as described with reference to FIGS. 5 through 8.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

```
LOC CODE   LINE

0000              .SYM
0000              .MEM
0000       ;
0000       ;
0000       ; ****************
0000       ; * SYMBOLE TABLE *
0000       ; ****************
0000       ;
0000       ;
0000       PIA1    =$C0C4
0000       PIA2    =PIA1+4
0000
0000       ;
0000       SGNA    =$00
0000       ACCA    =$01
0000       SGNB    =$03
0000       ACCB    =$04
0000       SGNS    =$06
0000       ANS     =$07
0000       ALOWID  =$09             ;FOR MAST
0000       BUF1    =$0A
0000       ;    <ALOWID,S> =$0B      ;FOR SLVE
0000       SGND2   =$0C
0000       D2      =$0D
0000       ;
0000       TM      =$0E
0000       TS      =$10
0000       ;
0000       ;
0000       D=$12                 ;<<<<   >>>>
0000       ;
0000       ;
0000       TRM     =D
0000       TRS     =D+2
0000       HALFTM  =D+4
0000       HALFTS  =D+6
0000       TMMIN   =D+8
```

```
0000     TSMIN   =D+10
0000     TEMST   =D+12
0000     TESLV   =D+14
0000     TMBUF   =D+16
0000     TSBUF   =D+18
0000     VCBUF   =D+20           ;FOR MASTER
0000     ;      <VCBUF,S> =D+22    ;FOR SLAVE
0000     ;
0000     ;                 =D+24
0000     ;                 =D+26
0000     ;                 =D+28
0000     ;
0000     ;
0000     FLGME   =D+30
0000     FMST    =D+31
0000     FLGSE   =D+32
0000     FSLV    =D+33
0000     VMST1   =D+34
0000     VMST2   =D+35
0000     VSLV1   =D+36
0000     VSLV2   =D+37
0000     DFMST   =D+38
0000     SGNDFM  =D+39
0000     DFSLV   =D+40
0000     SGNDFS  =D+41
0000     MPTR    =D+42
0000     PRIM    =D+43
0000     SPTR    =D+44
0000     PRIS    =D+45
0000     NECNTM  =D+46
0000     BCNTM   =D+47
0000     NECNTS  =D+48
0000     BCNTS   =D+49
0000     ;
0000     DRMNEF  =D+50
0000     FLGDLY  =D+51
0000     ;     <DRMNEF,S> =D+52
0000     ;     <FLGDLY,S> =D+53
0000     PWRUP1  =D+54
0000     VCSGN   =D+55
0000     PWRUP2  =D+56
0000     ;     <VCSGN,S>  =D+57
0000     MSKMST  =D+58
0000     OUTMST  =D+59
0000     MSKSLV  =D+60
0000     OUTSLV  =D+61
0000     FLGMST  =D+62
0000     FLGRES  =D+63
0000     FLGSLV  =D+64
0000     ;     <FLGRES,S> =D+65
0000     INICNT  =D+66
0000     NOTRCK  =D+67           ;new
0000     ;     <INICNT,S> =D+68
0000     INHBTR  =D+69           ;new flag
0000     ;                     ;;;;;;;;;;;;
0000     MREADY  =D+70
0000     CNTRDY  =D+71
0000     SMODE   =D+72
0000     SETBC   =D+73
0000     WATCHG  =D+74
0000     ICNST   =D+75
0000     PCNST   =D+76
```

```
0101 0000          BUF2    =D+77
0102 0000          STFLG   =D+78
0103 0000          ;                  =D+79
0104 0000          ;
0105 0000          PAVM    =D+80
0106 0000          PAVS    =D+82
0107 0000          MSTWRK  =D+84
0108 0000          SLVWRK  =D+86
0109 0000          ;
0110 0000          E=10
0111 0000          PMBL    =E+100
0112 0000          PMBH    =E+120
0113 0000          PSBL    =E+140
0114 0000          PSBH    =E+160
0115 0000          FMBUF   =E+180
0116 0000          FSBUF   =E+220
0117 0000          ;
0118 0000          UPDFLG  =E+240
0119 0000
0120 0000          ;

0121 0000          .FILE 'MAIN ROUTINE-R3 ROM'
0123 0000          ;
0125 0000          ;
0126 0000                  *=$F000
0127 F000          ;
0128 F000 4C10F0   RESET   JMP RESET1
0129 F003                          ;
0130 F003                          ;
0131 F003          ;  ******************
0132 F003          ;  * CONSTANT TABLE *
0133 F003          ;  ******************
0134 F003          ;
0135 F003 90       C1      .BYTE 144,164,86    ;for VCALC
0135 F004 A4
0135 F005 56
0136 F006 14       DEVI    .BYTE 20,26,36,51   ;2.56*N   N:%
0136 F007 1A
0136 F008 24
0136 F009 33
0137 F00A 0A       ISOFT   .BYTE 10,8          ;soft hard
0137 F00B 08
0138 F00C C8       PSOFT   .BYTE 200,64        ;P=128/Pcnst
0138 F00D 40
0139 F00E 1E       LOWER   .BYTE 30
0140 F00F 8C       UPPER   .BYTE 140
0141 F010          ;
0142 F010          ;
0143 F010          ;  *********
0144 F010          ;  * RESET *
0145 F010          ;  *********
0146 F010          ;
0147 F010          ;
0148 F010 A9AB     RESET1  LDA #<IRQ        ;save IRQ vector
0149 F012 8DFE03           STA $3FE       ;    $03FE
0150 F015 A9F0             LDA #>IRQ
0151 F017 8DFF03           STA $3FF
0152 F01A          ;
0153 F01A A548             LDA PWRUP1
0154 F01C 49E5             EOR #$E5
0155 F01E C54A             CMP PWRUP2
```

```
F020 F015           BEQ HSTRT
F022                      ;
F022 A99B           LDA #$9B      ;COLD START
F024 8548           STA PWRUP1
F026 49E5           EOR #$E5
F028 854A           STA PWRUP2
F02A A908           LDA #$8       ;'8' in SETBC
F02C 855B           STA SETBC
F02E A95A           LDA #$5A      ;center value
F030 8531           STA FMST      ; -$5A- for F-out
F032 8533           STA FSLV
F034                      ;
F034 200CF2         JSR SETAM
F037 20D0F1 HSTRT   JSR INIPIA
F03A D8             CLD
F03B A531           LDA FMST
F03D                      ;
F03D 2038F2 INI1    JSR INIMAS
F040        ;
F040 A900           LDA #0
F042 855A           STA SMODE
F044 8555           STA NOTRCK     ;clear NOTRCK
F046 A914           LDA #<MWORK6
F048 8566           STA MSTWRK
F04A A9F7           LDA #>MWORK6
F04C 8567           STA MSTWRK+1
F04E A985           LDA #<SWORK6
F050 8568           STA SLVWRK
F052 A9F7           LDA #>SWORK6
F054 8569           STA SLVWRK+1
F056        ;
F056 ADC4C0         LDA PIA1
F059 ADC5C0         LDA PIA1+1
F05C 0901           ORA #%00000001
F05E 8DC5C0         STA PIA1+1
F061        ;
F061 ADC9C0         LDA PIA2+1     ;enable PIA-2
F064 0901           ORA #%00000001 ;  CA1 & CB1 IRQ
F066 8DC9C0         STA PIA2+1
F069 ADCBC0         LDA PIA2+3
F06C 0901           ORA #%00000001
F06E 8DCBC0         STA PIA2+3
F071 ADC8C0         LDA PIA2
F074 ADCAC0         LDA PIA2+2
F077        ;
F077        ;
F077 58     MAIN    CLI
F078 2094F8         JSR KBDCHK
F07B        ;
F07B A54C           LDA MSKMST
F07D 2DC4C0         AND PIA1
F080 F005           BEQ *+7
F082 206FF2         JSR MSTDRM
F085 A9FF           LDA #$FF
F087 8550           STA FLGMST   ;<*+7>
F089        ;
F089 A55A           LDA SMODE
F08B F0EA           BEQ MAIN
F08D A54E           LDA MSKSLV
F08F 2DC4C0         AND PIA1
F092 F005           BEQ *+7
F094 20A4F2         JSR SLVDRM
```

```
F097 A9FF          LDA #$FF
F099 8552          STA FLGSLV  ;<*+7>
F09B 4C77F0        JMP MAIN
F09E            ;
F09E            ;
F09E            ;
F09E FF            .BYTE $FF
F09F FF            .BYTE $FF,$FF,$FF
F0A0 FF
F0A1 FF
F0A2 FF            .BYTE $FF,$FF,$FF
F0A3 FF
F0A4 FF
F0A5 FF            .BYTE $FF,$FF,$FF
F0A6 FF
F0A7 FF
F0A8 FF            .BYTE $FF,$FF,$FF
F0A9 FF
F0AA FF
F0AB            ;
F0AB            ;

F0AB            .FILE 'IRQ ROUTINE-R3 ROM'
F0AB            ;
F0AB            ;
F0AB            ;  ***************
F0AB            ;  * IRQ ROUTINE *
F0AB            ;  ***************
F0AB            ;
F0AB            ;
F0AB 48         IRQ    PHA            ; <NOP> for MON
F0AC 8A                TXA
F0AD 48                PHA
F0AE 98                TYA
F0AF 48                PHA
F0B0            ;
F0B0 ADC5C0            LDA PIA1+1   ;load PIA1-CRA
F0B3 1021              BPL BRESET   ;if not clock
F0B5                   ;  then BEAT-RESET
F0B5 A9FE              LDA #%11111110
F0B7 2DC5C0            AND PIA1+1
F0BA 8DC5C0            STA PIA1+1   ;DISABLE IRQ
F0BD A200              LDX #$0      ;SET "MASTER"
F0BF A000              LDY #$0
F0C1 2021F1            JSR INCT
F0C4 A202              LDX #$2      ;SET "SLAVE"
F0C6 A002              LDY #$2
F0C8 2021F1            JSR INCT
F0CB                             ;
F0CB A55C              LDA WATCHG   ;DEC COUNTER FOR
F0CD F002              BEQ IRQ1     ;  CHANGE INHIBITOR
F0CF C65C              DEC WATCHG   ; ' =0 ' ENABLE
F0D1                             ;
F0D1 A200       IRQ1   LDX #$0
F0D3 6C6600            JMP (MSTWRK)
F0D6            ;
F0D6            ;
F0D6            ; ****** BEAT RESET *******
F0D6            ;
F0D6            ;
F0D6 ADC9C0     BRESET LDA PIA2+1      ;PIA2 CRA
F0D9 100F              BPL CHKCB
```

```
F0DB 29FC               AND #%11111100
F0DD 8DC9C0             STA PIA2+1  ;disable IRQ of
F0E0 20FAF0             JSR RESMST  ;       M-reset
F0E3                          ;
F0E3 68      RESRTI     PLA
F0E4 A8                 TAY
F0E5 68                 PLA
F0E6 AA                 TAX
F0E7 4C94F7             JMP IRQRTN
F0EA                          ;
F0EA ADCBC0  CHKCB      LDA PIA2+3     ;PIA2 CRB
F0ED 10F4               BPL RESRTI
F0EF 29FC               AND #%11111100
F0F1 8DCBC0             STA PIA2+3  ;disable IRQ of
F0F4 20FEF0             JSR RESSLV  ;       S-reset
F0F7 4CE3F0             JMP RESRTI
F0FA                 ;
F0FA                 ;
F0FA                 ;  ****** RESET MASTER & SLAVE *****
F0FA                 ;
F0FA                 ;
F0FA A200    RESMST     LDX #0
F0FC F002               BEQ RESSLV+2
F0FE                          ;
F0FE A202    RESSLV     LDX #2
F100 A45B               LDY SETBC
F102                          ;
F102 88                 DEY            ;<RESAB>
F103 B530               LDA FLGME,X
F105 F005               BEQ RESAB1
F107 B53D               LDA PRIM,X
F109 3001               BMI RESAB1
F10B 88                 DEY
F10C 98      RESAB1     TYA
F10D 9541               STA BCNTM,X
F10F                 ;
F10F                 ;
F10F                 ;  *******************************
F10F                 ;  * INCREMENT BEAT-COUNTER      *
F10F                 ;  *      AND OUTPUT 'First-BEAT' *
F10F                 ;  *******************************
F10F                 ;
F10F                 ;
F10F 2031F9  INCBC      JSR TLMPON
F112 EA                 NOP
F113 6900               ADC #0
F115 C55B               CMP SETBC
F117 9005               BCC *+7
F119 2025F9             JSR BSGON
F11C A900               LDA #0
F11E 9541               STA BCNTM,X    ; <<< *+7 >>>
F120 60                 RTS
F121                 ;
F121                 ;
F121                 ;  *********************
F121                 ;  * INCREMENT TM OR TS *
F121                 ;  *********************
F121                 ;       WITH 'X' & 'Y'
F121                 ;
F121 2055F9  INCT       JSR INCT1
F124 EA                 NOP
F125 EA                 NOP
```

```
F126 EA            NOP
F127                    ;
F127 B53D   CMPTR  LDA PRIM,X
F129 3033          BMI TRCHK       ;if PRI-state
F12B                    ;                 ; then check TR
F12B C8            INY
F12C C8            INY
F12D C8            INY
F12E C8            INY
F12F 20AFF1        JSR CMPT        ;compare with HALF
F132 9029          BCC RTN         ; if T< then return
F134                    ;
F134 B545          LDA FLGDLY,X
F136 304D          BMI HALFTE
F138                    ;
F138 C8            INY
F139 C8            INY
F13A C8            INY
F13B C8            INY
F13C 20AFF1        JSR CMPT        ;compare with TMIN
F13F 901C          BCC RTN         ; if T< then return
F141                    ;
F141 A90F          LDA #$0F        ;T>=TMIN then set
F143 9530          STA FLGME,X     ;    $0F to FLGME
F145                    ;
F145 C8            INY
F146 C8            INY
F147 C8            INY
F148 C8            INY
F149 20AFF1        JSR CMPT        ;compare with T-Esti
F14C 900F          BCC RTN         ; if T< then return
F14E                    ;
F14E 200FF1        JSR INCBC       ;T=T-Esti then
F151 A900          LDA #0          ;  incriment B-counter
F153 950E          STA TM,X        ;  clear T
F155 950F          STA TM+1,X      ;  set PRIM flag
F157 A9FF          LDA #$FF        ;    and FLGDLY
F159 953D          STA PRIM,X
F15B 9545          STA FLGDLY,X
F15D                    ;
F15D 60     RTN    RTS
F15E        ;
F15E        ; ***** CMP T WITH TR *****
F15E        ;
F15E 20AFF1 TRCHK  JSR CMPT
F161 90FA          BCC RTN
F163 A900          LDA #0          ;if T=TR then
F165 953D          STA PRIM,X
F167 9530          STA FLGME,X
F169 A9FF          LDA #$FF
F16B 9544          STA DRMNEF,X    ;for inhibit P-CALC
F16D 8A            TXA             ;     in M-S Work
F16E F004          BEQ INCALW
F170 A555          LDA NOTRCK
F172 300E          BMI TOFOUT
F174 F609   INCALW INC ALOWID,X    ;widen capture range
F176 B509          LDA ALOWID,X
F178 C908          CMP #8          ;=7+1
F17A 9006          BCC TOFOUT
F17C D609          DEC ALOWID,X
F17E A9FF          LDA #$FF
F180 9530          STA FLGME,X
```

```
F182 4CD7F3 TOFOUT JMP FNOUT
F185               ;
F185               ; ***** T = 1/2 T-Esti *****
F185               ;
F185 A900   HALFTE LDA #0
F187 9545          STA FLGDLY,X    ;reset Delay flag
F189                         ;
F189 BDC8C0        LDA PIA2,X      ;clear the PIA2-
F18C BDC9C0        LDA PIA2+1,X    ; IRQ flag and
F18F 0901          ORA #%00000001  ; enable IRQ
F191 2043F9        JSR TLMPOF
F194                         ;
F194 A003   CLBLMP LDY #3          ;turn off the
F196 8A            TXA             ;    first-beat lamp
F197 F002          BEQ *+4
F199 A007          LDY #7          ; <*+4>
F19B A938          LDA #%00111000
F19D 19C4C0        ORA PIA1,Y
F1A0 99C4C0        STA PIA1,Y
F1A3                         ;
F1A3 8A            TXA             ;turnoff the
F1A4 D002          BNE *+4         ;    M-S beat lamp
F1A6 A901          LDA #%00000001
F1A8 0DC8C0        ORA PIA2
F1AB 8DC8C0        STA PIA2
F1AE 60            RTS
F1AF               ;
F1AF               ; ******************************
F1AF               ; * COMPARE T WITH HALF,MIN ETC.*
F1AF               ; ******************************
F1AF               ;
F1AF               ;
F1AF B50F   CMPT   LDA TM+1,X     ; T>=M ... C=1
F1B1 D91300        CMP TRM+1,Y    ; T<M  ... C=0
F1B4 90A7          BCC RTN
F1B6 D0A5          BNE RTN
F1B8 B50E          LDA TM,X       ;FOR EQUAL
F1BA D91200        CMP TRM,Y      ;  UPPER BYTE
F1BD 60            RTS
F1BE               ;
F1BE FF            .BYTE $FF,$FF,$FF
F1BF FF
F1C0 FF
F1C1 FF            .BYTE $FF,$FF,$FF
F1C2 FF
F1C3 FF
F1C4 FF            .BYTE $FF,$FF,$FF
F1C5 FF
F1C6 FF
F1C7 FF            .BYTE $FF,$FF,$FF
F1C8 FF
F1C9 FF
F1CA FF            .BYTE $FF,$FF,$FF
F1CB FF
F1CC FF
F1CD FF            .BYTE $FF,$FF,$FF
F1CE FF
F1CF FF
F1D0               ;
F1D0               ;

F1D0               .FILE 'SUB-1-R3 ROM'
```

```
F1D0                ;
F1D0                ;
F1D0                ;
F1D0                ;
F1D0                ; ******************
F1D0                ; * INITIALIZE PIA *
F1D0                ; ******************
F1D0                ;
F1D0                ;
F1D0 A904    INIPIA LDA #$04          ;'1' FOR
F1D2 8DC7C0         STA PIA1+3    ;       CRB1-2
F1D5 8DCBC0         STA PIA2+3    ;       CRB2-2
F1D8 A531           LDA FMST      ;SET 'F-MST'
F1DA 8DC6C0         STA PIA1+2    ;     PIA1 PB &
F1DD 8DCAC0         STA PIA2+2    ;       PIA2 PB
F1E0                       ;
F1E0 A200           LDX #$0
F1E2 8EC5C0         STX PIA1+1    ;SELECT DDR
F1E5 8EC7C0         STX PIA1+3
F1E8 8EC9C0         STX PIA2+1
F1EB 8ECBC0         STX PIA2+3
F1EE                       ;
F1EE 8EC4C0         STX PIA1      ;SET DDR
F1F1 CA             DEX
F1F2 8EC6C0         STX PIA1+2
F1F5 8ECAC0         STX PIA2+2
F1F8 A21F           LDX #%00011111
F1FA 8EC8C0         STX PIA2
F1FD                       ;
F1FD A9FC           LDA #%11111100
F1FF 8DC5C0         STA PIA1+1    ;SELECT PIR
F202 8DC7C0         STA PIA1+3
F205 8DC9C0         STA PIA2+1
F208 8DCBC0         STA PIA2+3
F20B 60             RTS           ;RETURN WITH
F20C                ;              ;     IRQ DISABLE
F20C                ;
F20C                ;
F20C                ; ********************
F20C                ; * SET A FOR MASTER *
F20C                ; ********************
F20C                ;
F20C                ;
F20C A001    SETAM  LDY #$01
F20E 844C           STY MSKMST
F210 C8             INY           ;Y=#$02
F211 844E           STY MSKSLV
F213 844D           STY OUTMST
F215 A006           LDY #$06
F217 844F           STY OUTSLV
F219 A938           LDA #%00111000 ;A-MASTER
F21B 0DC5C0         ORA PIA1+1     ;   LAMP ON
F21E 8DC5C0         STA PIA1+1
F221 60             RTS
F222                ;
F222                ;
F222                ; ********************
F222                ; * SET B FOR MASTER *
F222                ; ********************
F222                ;
F222                ;
```

```
F222 A001   SETBM  LDY #$01
F224 844E          STY MSKSLV
F226 C8            INY              ;Y=#$02
F227 844C          STY MSKMST
F229 844F          STY OUTSLV
F22B A006          LDY #$06
F22D 844D          STY OUTMST
F22F A9F7          LDA #%11110111  ;A-MASTER
F231 2DC5C0        AND PIA1+1      ;    LAMP OFF
F234 8DC5C0        STA PIA1+1
F237 60            RTS
F238               ;
F238               ;
F238               ; *********************
F238               ; * MASTER INITIALIZE *
F238               ; *********************
F238               ;
F238               ;
F238 8531   INIMAS STA FMST         ;ENTER WITH
F23A A44D          LDY OUTMST      ;  "FOUT" IN 'A'
F23C 99C4C0        STA PIA1,Y      ;output it
F23F A200          LDX #$0
F241 860E          STX TM          ;CLEAR TM & DTM
F243 860F          STX TM+1        ;
F245 8638          STX DFMST
F247 8639          STX SGNDFM
F249               ;
F249 2057F8        JSR INITRS      ;jsr with ' X=0 '
F24C               ;
F24C A900          LDA #$0
F24E 8558          STA MREADY
F250 853D          STA PRIM
F252 8540          STA NECNTM
F254 A90F          LDA #$F
F256 853C          STA MPTR        ;SET PM-BUF PTR
F258 A911          LDA #$11
F25A 8554          STA INICNT
F25C 60            RTS
F25D               ;
F25D FF            .BYTE $FF,$FF,$FF
F25E FF
F25F FF
F260 FF            .BYTE $FF,$FF,$FF
F261 FF
F262 FF
F263 FF            .BYTE $FF,$FF,$FF
F264 FF
F265 FF
F266 FF            .BYTE $FF,$FF,$FF
F267 FF
F268 FF
F269 FF            .BYTE $FF,$FF,$FF
F26A FF
F26B FF
F26C FF            .BYTE $FF,$FF,$FF
F26D FF
F26E FF
F26F               ;
F26F               ;

F26F          .FILE 'SUB-2-R3 ROM'
```

```
F26F              ;
F26F              ;
F26F              ; ***************
F26F              ; * MASTER DRAM *
F26F              ; ***************
F26F              ;
F26F              ;
F26F A550         MSTDRM LDA FLGMST
F271 D030                BNE RTS2
F273 A430                LDY FLGME    ;IF TM<MIN
F275 F02C                BEQ RTS2     ;    THEN RETURN
F277                            ;
F277 78                  SEI
F278 A200                LDX #$0
F27A                            ;
F27A 20D8F2              JSR CHKTMX
F27D                            ;          ;IF NE-COUNT OVER
F27D 9007                BCC EFMCHK   ;  RETURN WITH 'C-SET'
F27F 68                  PLA
F280 68                  PLA
F281 A531                LDA FMST
F283 4C3DF0              JMP INI1
F286                            ;
F286 D00F         EFMCHK BNE CLRTM
F288              ;
F288 20D7F3              JSR FNOUT    ;effect beat
F28B                            ;         << JSR DISP  For MOM >>
F28B                            ;
F28B A555                LDA NOTRCK
F28D 1008                BPL CLRTM
F28F C657                DEC INHBTR   ;decrement counter
F291 1004                BPL CLRTM    ; for TRACKING enable
F293 A900                LDA #0
F295 8555                STA NOTRCK
F297                            ;
F297 A000         CLRTM  LDY #$0
F299 840E                STY TM
F29B 840F                STY TM+1
F29D 8430                STY FLGME
F29F 88                  DEY
F2A0 8445                STY FLGDLY
F2A2 58                  CLI          ;ENABLE IRQ
F2A3 60           RTS2   RTS
F2A4              ;
F2A4              ;
F2A4              ; **************     ;FLGSE=FLGME+2
F2A4              ; * SLAVE DRAM *
F2A4              ; **************
F2A4              ;
F2A4              ;
F2A4 A558         SLVDRM LDA MREADY
F2A6 10FB                BPL RTS2
F2A8 A55A                LDA SMODE    ;IF SMODE=0
F2AA F0F7                BEQ RTS2     ;  THEN RETURN
F2AC A552                LDA FLGSLV
F2AE D0F3                BNE RTS2
F2B0 A532                LDA FLGSE    ;IF TS<MIN
F2B2 F0EF                BEQ RTS2     ;  THEN RETURN
F2B4                            ;
F2B4 78                  SEI          ;DISABLE IRQ
F2B5 201AF9              JSR LAMPOF
F2B8 A202                LDX #$2
```

```
F2BA 20D8F2                JSR CHKTMX
F2BD 9003                  BCC *+5       ;IF NE-COUNT OVER
F2BF 4C37F8                JMP START1    ; TRY AGAIN FROM START
F2C2                                 ;
F2C2 D00A                  BNE CLRTS     ;<<< *+5 >>>
F2C4 A555                  LDA NOTRCK
F2C6 3003                  BMI *+5       ;if NO-tracking mode
F2C8 203BF3                JSR DFCALC    ;  then skip
F2CB 20D7F3                JSR FNOUT     ;  < *+5 >
F2CE                                 ;
F2CE A900          CLRTS   LDA #$0
F2D0 8510                  STA TS
F2D2 8511                  STA TS+1
F2D4 8532                  STA FLGSE
F2D6 58                    CLI           ;ENABLE IRQ
F2D7 60                    RTS
F2D8               ;
F2D8               ;
F2D8               ;
F2D8               ; ***************************
F2D8               ; * CHECK THE CONDITION OF T *
F2D8               ; ***************************
F2D8               ;
F2D8               ;
F2D8 B53D          CHKTMX  LDA PRIM,X
F2DA 1011                  BPL CHKT1
F2DC                                 ;
F2DC 18                    CLC
F2DD B51E                  LDA TEMST,X    ;IF PRIM BE SET
F2DF 750E                  ADC TM,X       ;     T=TE+T
F2E1 950E                  STA TM,X
F2E3 B51F                  LDA TEMST+1,X
F2E5 750F                  ADC TM+1,X     ;over flow
F2E7 9002                  BCC *+4        ;  then $FF to TM+1
F2E9 A9FF                  LDA #$FF
F2EB 950F                  STA TM+1,X     ;<<< *+4 >>>
F2ED                                 ;
F2ED B530          CHKT1   LDA FLGME,X
F2EF 1007                  BPL TEFFCT
F2F1                                 ;
F2F1 F640                  INC NECNTM,X
F2F3 B440                  LDY NECNTM,X
F2F5 C004                  CPY #4         ;IF OVER THE
F2F7 60                    RTS            ; ALLOWED NO.
F2F8               ;                         THEN RTS WITH "$FF"
F2F8               ;                                IN ACC
F2F8               ;
F2F8               ;
F2F8 B558          TEFFCT  LDA MREADY,X    ;MREADY+2 =SMODE
F2FA 1006                  BPL CLNCNT
F2FC B509                  LDA ALOWID,X   ;Beat effect then
F2FE F002                  BEQ CLNCNT     ; decriment ALOWID
F300 D609                  DEC ALOWID,X
F302
F302 A900          CLNCNT  LDA #$0
F304 9540                  STA NECNTM,X
F306 9544                  STA DRMNEF,X   ;RESET 'DRMNEF'
F308 B50E                  LDA TM,X       ;save TM,X in buffer
F30A 9522                  STA TMBUF,X
F30C B50F                  LDA TM+1,X
F30E 9523                  STA TMBUF+1,X
F310                                 ;
```

```
0680 F310 B53D          LDA PRIM,X      ;IF DRM BE EFFECT
0681 F312 3003          BMI *+5         ;    & PRIM,X>=0
0682 F314 200FF1        JSR INCBC       ;  THEN INC. BEAT-C
0683 F317                          ;
0684 F317 A9FE          LDA #%11111110    ; << *+5 >>
0685 F319 E000          CPX #0
0686 F31B D00C          BNE FACH1
0687 F31D 2DC8C0 BRAD   AND PIA2        ; <<< *+4 >>>
0688 F320 8DC8C0        STA PIA2
0689 F323 A900          LDA #$0
0690 F325 953D          STA PRIM,X
0691 F327 18            CLC
0692 F328 60            RTS
0693 F329        ;
0694 F329 A9FD   FACH1  LDA #%11111101
0695 F32B D0F0          BNE BRAD
0696 F32D        ;
0697 F32D FF            .BYTE $FF,$FF
0697 F32E FF
0698 F32F FF            .BYTE $FF,$FF,$FF
0698 F330 FF
0698 F331 FF
0699 F332 FF            .BYTE $FF,$FF,$FF
0699 F333 FF
0699 F334 FF
0700 F335 FF            .BYTE $FF,$FF,$FF
0700 F336 FF
0700 F337 FF
0701 F338 FF            .BYTE $FF,$FF,$FF
0701 F339 FF
0701 F33A FF
0702 F33B        ;
0703 F33B        ;

0704 F33B        .FILE 'SUB-3-R3 ROM'
0706 F33B        ;
0707 F33B        ;
0708 F33B        ; *******************
0709 F33B        ; * D-F CALCULATION *
0710 F33B        ; *******************
0711 F33B        ;
0712 F33B        ;
0713 F33B A530   DFCALC LDA FLGME
0714 F33D 3047          BMI RTS4
0715 F33F                          ;
0716 F33F A900          LDA #$0       ;IF DELAY
0717 F341 8501          STA ACCA      ;  THEN D1=-(TM)
0718 F343 8502          STA ACCA+1    ;IF NOT DELAY
0719 F345 8500          STA SGNA      ;  THEN DI=(TEMST)-TM
0720 F347 8503          STA SGNB
0721 F349 A545          LDA FLGDLY    ;'FLGDLY' FOR MST
0722 F34B 3008          BMI DFC1
0723 F34D A51E          LDA TEMST
0724 F34F 8501          STA ACCA
0725 F351 A51F          LDA TEMST+1
0726 F353 8502          STA ACCA+1
0727 F355 A50E   DFC1   LDA TM
0728 F357 8504          STA ACCB
0729 F359 A50F          LDA TM+1
0730 F35B 8505          STA ACCB+1
0731 F35D 20FAF5        JSR SUB16     ;D1 IS IN 'ANS'
0732 F360 2087F3        JSR DCALC1
```

```
F363 A50D            LDA D2
F365 C915            CMP #$15    ;***CAPTURE RANGE***
F367 9004            BCC DFC2    ;     MAY BE CHANGED
F369 A900            LDA #$0
F36B 8559            STA CNTRDY  ;IF D2<CAPT THEN
F36D E659     DFC2   INC CNTRDY  ;  INCREMENT CNTRDY
F36F A905            LDA #$5     ;***MAY CHANGE***
F371 C559            CMP CNTRDY
F373 B011            BCS RTS4
F375 C659            DEC CNTRDY
F377                             ;
F377 A920            LDA #%00100000
F379 2DC8C0          AND PIA2    ;Auto change?
F37C D005            BNE RLMPON
F37E 4C69F9          JMP CHKFDA
F381 EA              NOP
F382 EA              NOP
F383                             ;
F383 200FF9   RLMPON JSR LAMPON
F386 60       RTS4   RTS
F387          ;
F387          ;
F387          ; *********************
F387          ; * D-F CALCULATION-1 *
F387          ; *********************
F387          ;
F387          ;
F387 A50C     DCALC1 LDA SGND2       ;SAVE D2 INTO ACCA
F389 8500            STA SGNA
F38B A50D            LDA D2
F38D 8501            STA ACCA
F38F A506            LDA SGNS    ;RENEW D2 BY D1
F391 850C            STA SGND2
F393 A507            LDA ANS
F395 850D            STA D2
F397 A55D            LDA ICNST   ;Integral CONST.
F399 8504            STA ACCB
F39B 2061F6          JSR DIV8    ;D1/I  ..RET WITH
F39E A507            LDA ANS     ;          "C"=0
F3A0 650D            ADC D2
F3A2 8504            STA ACCB
F3A4 A50C            LDA SGND2
F3A6 8503            STA SGNB
F3A8 20CDF5          JSR SUB8    ;ANS=D2-D1(1+1/I)
F3AB                             ;
F3AB A507            LDA ANS     ;ANSL*128 into ANS
F3AD 6A              ROR A
F3AE 8508            STA ANS+1
F3B0 A900            LDA #0
F3B2 6A              ROR A
F3B3 8507            STA ANS
F3B5                             ;
F3B5 A900            LDA #0
F3B7 8503            STA SGNB
F3B9 A55E            LDA PCNST   ;Proportional
F3BB 8504            STA ACCB    ;       CONST
F3BD 2086F6          JSR DIV16   ;ANS=-{(D1-D2)
F3C0          ;                        +D1/I}*128/P
F3C0 A506            LDA SGNS
F3C2 853B            STA SGNDFS
F3C4 A507            LDA ANS
F3C6 A408            LDY ANS+1   ;if !ANS! >255
```

```
F3C8 F002          BEQ *+4      ;  then put 255
F3CA A9FF          LDA #$FF     ;         into ANS
F3CC                      ;
F3CC A45A          LDY SMODE    ;if SMODE>=0
F3CE 3004          BMI SETDFS   ;  then set "0"
F3D0 A900          LDA #0       ;   to DFSLV
F3D2 8559          STA CNTRDY   ;       & CNTRDY
F3D4                      ;
F3D4 853A   SETDFS STA DFSLV
F3D6 60            RTS
F3D7        ;
F3D7        ; **************
F3D7        ; * OUT PUT FN *
F3D7        ; **************
F3D7        ;
F3D7        ;
F3D7 B538   FNOUT  LDA DFMST,X
F3D9 8504          STA ACCB
F3DB B539          LDA SGNDFM,X
F3DD 8503          STA SGNB
F3DF B531          LDA FMST,X
F3E1 8501          STA ACCA
F3E3 A000          LDY #$0
F3E5 8400          STY SGNA
F3E7 20D3F5        JSR ADD8     ;ANS=F+DF
F3EA 860A          STX BUF1     ;SAVE 'X'
F3EC A507          LDA ANS
F3EE 900B          BCC FNO1
F3F0 A9FF          LDA #$FF     ;Overflow $FF to A
F3F2 A8            TAY          ;              &  Y
F3F3 A606          LDX SGNS
F3F5 1004          BPL FNO1
F3F7 A900          LDA #$0      ;Underflow 0 to A
F3F9 A0FF          LDY #$FF     ;         & $FF to Y
F3FB
F3FB 2097F9 FNO1   JSR CHKUL
F3FE 48            PHA
F3FF EA            NOP
F400                      ;
F400 F015          BEQ FNOUT1
F402 8501          STA ACCA     ;if over or under
F404 B531          LDA FMST,X   ; then calculate DF
F406 8504          STA ACCB
F408 A900          LDA #$0
F40A 8503          STA SGNB
F40C 20CDF5        JSR SUB8
F40F A506          LDA SGNS
F411 9539          STA SGNDFM,X
F413 A507          LDA ANS
F415 9538          STA DFMST,X
F417                      ;
F417 E000   FNOUT1 CPX #$0
F419 D00C          BNE FOSLV
F41B A9C1          LDA #<MWORK1
F41D 8566          STA MSTWRK
F41F A9F6          LDA #>MWORK1
F421 8567          STA MSTWRK+1
F423 A44D          LDY OUTMST
F425 D00A          BNE FNOUT2
F427                      ;
F427 A919   FOSLV  LDA #<SWORK1
F429 8568          STA SLVWRK
```

```
0857 F42B A9F7          LDA #>SWORK1
0858 F42D 8569          STA SLVWRK+1
0859 F42F A44F          LDY OUTSLV
0860 F431                     ;
0861 F431 68     FNOUT2 PLA
0862 F432 9531          STA FMST,X
0863 F434 99C4C0        STA PIA1,Y
0864 F437 A900          LDA #$0       ;RESET 'UPD-FLAG'
0865 F439 95FA          STA UPDFLG,X
0866 F43B 60            RTS
0867 F43C        ;
0868 F43C FF            .BYTE $FF,$FF,$FF
0868 F43D FF
0868 F43E FF
0869 F43F FF            .BYTE $FF,$FF,$FF
0869 F440 FF
0869 F441 FF
0870 F442 FF            .BYTE $FF,$FF,$FF
0870 F443 FF
0870 F444 FF
0871 F445 FF            .BYTE $FF,$FF,$FF
0871 F446 FF
0871 F447 FF
0872 F448 FF            .BYTE $FF,$FF,$FF
0872 F449 FF
0872 F44A FF
0873 F44B FF            .BYTE $FF,$FF,$FF
0873 F44C FF
0873 F44D FF
0874 F44E        ;
0875 F44E        ;

0876 F44E        .FILE 'SUB-4-R3 ROM'
0878 F44E        ;
0879 F44E        ;
0880 F44E        ; *****************
0881 F44E        ; * V-CALCULATION *
0882 F44E        ; *****************
0883 F44E        ;
0884 F44E        ;
0885 F44E B539   VCALC  LDA SGNDFM,X
0886 F450 8500          STA SGNA
0887 F452 B538          LDA DFMST,X
0888 F454 8501          STA ACCA
0889 F456 A9FF          LDA #$FF
0890 F458 8503          STA SGNB
0891 F45A A94D          LDA #77       ;=$4D
0892 F45C 8504          STA ACCB
0893 F45E        ;
0894 F45E 203DF6        JSR MULT
0895 F461        ;
0896 F461 A900          LDA #$0
0897 F463 8500          STA SGNA
0898 F465 8502          STA ACCA+1
0899 F467 8505          STA ACCB+1
0900 F469 B531          LDA FMST,X
0901 F46B 8501          STA ACCA
0902 F46D A506          LDA SGNS
0903 F46F 8503          STA SGNB
0904 F471 A508          LDA ANS+1     ;ANS/256
0905 F473 8504          STA ACCB
0906 F475 2000F6        JSR ADD16
```

```
F478 A507          LDA ANS          ;VCBUF=VCB1
F47A 4608          LSR ANS+1        ; =(F-77*DF/256)/2
F47C 6A            ROR A
F47D 6900          ADC #$0
F47F 9526          STA VCBUF,X
F481 A506          LDA SGNS
F483 9549          STA VCSGN,X
F485                   ;
F485 A900          LDA #$0          ;CLEAR THE 'DF'
F487 9538          STA DFMST,X
F489 9539          STA SGNDFM,X
F48B                   ;                  ;RETURN WITH
F48B 60            RTS              ;      'C'=0
F48C          ;
F48C          ;
F48C B526   VCALC1 LDA VCBUF,X
F48E 8501          STA ACCA
F490 AD04F0        LDA C1+1         ;C1+1=C2
F493 8504          STA ACCB
F495 203DF6        JSR MULT
F498 A507          LDA ANS          ;VCBUF=C2*VCB
F49A 9526          STA VCBUF,X
F49C A508          LDA ANS+1
F49E 9527          STA VCBUF+1,X
F4A0 18            CLC
F4A1 60            RTS
F4A2          ;
F4A2          ;
F4A2 B526   VCALC2 LDA VCBUF,X
F4A4 8507          STA ANS
F4A6 B527          LDA VCBUF+1,X
F4A8 8508          STA ANS+1
F4AA B531          LDA FMST,X
F4AC 4A            LSR A
F4AD 4A            LSR A
F4AE 18            CLC
F4AF 6D03F0        ADC C1           ;'C1' = CONST
F4B2 8504          STA ACCB
F4B4 2086F6        JSR DIV16
F4B7 AD05F0        LDA C1+2         ;C1+2=C10 :CONST
F4BA B449          LDY VCSGN,X
F4BC 3005          BMI VCSUB
F4BE 18            CLC
F4BF 6507          ADC ANS
F4C1 9003          BCC SETV
F4C3                   ;
F4C3 38     VCSUB  SEC
F4C4 E507          SBC ANS
F4C6 9534   SETV   STA VMST1,X
F4C8 18            CLC
F4C9 60            RTS
F4CA          ;
F4CA          ;
F4CA          ;  ****************
F4CA          ;  * P-CALCULATION *
F4CA          ;  ****************
F4CA          ;
F4CA          ;
F4CA B522   PCALC  LDA TMBUF,X
F4CC 5623          LSR TMBUF+1,X
F4CE 6A            ROR A            ;A=TMBUF,X/2
F4CF 8501          STA ACCA
```

```
F4D1 B535           LDA VMST2,X
F4D3 8504           STA ACCB
F4D5              ;
F4D5 203DF6         JSR MULT
F4D8              ;
F4D8 A900           LDA #$0
F4DA E000           CPX #$0
F4DC F002           BEQ *+4         ;TO <SETY>
F4DE A928           LDA #40
F4E0 18             CLC             ;<SETY>
F4E1 753C           ADC MPTR,X
F4E3 A8             TAY             ;SET 'Y'
F4E4 A507           LDA ANS         ; P-BUF POINTER
F4E6 996E00         STA PMBL,Y
F4E9 A508           LDA ANS+1
F4EB 998200         STA PMBH,Y
F4EE              ;
F4EE B531           LDA FMST,X      ;SAVE F-OUT
F4F0 99BE00         STA FMBUF,Y     ; TO FBUFFER
F4F3              ;
F4F3 D63C           DEC MPTR,X
F4F5 1004           BPL RENWV
F4F7 A90F           LDA #$F
F4F9 953C           STA MPTR,X
F4FB B534    RENWV  LDA VMST1,X     ;RENEW V2 BY V1
F4FD 9535           STA VMST2,X
F4FF 60             RTS
F500              ;
F500              ;
F500              ; ************************
F500              ; * P-AVERAGE CALCULATION *
F500              ; ************************
F500              ;
F500              ;
F500 A900    PAVRG  LDA #$0         ;USE ACCA & SGNA
F502 8500           STA SGNA        ; FOR 3-BYTE ACC
F504 8501           STA ACCA
F506 8502           STA ACCA+1
F508              ;
F508 A90F           LDA #$F
F50A 850A           STA BUF1
F50C D8             CLD
F50D E000           CPX #$0
F50F F003           BEQ *+5         ;TO <SETY OFSET>
F511 18             CLC
F512 6928           ADC #40         ;'C' =0
F514 A8             TAY             ;<SETY OFSET>
F515              ;
F515 B96E00  PLOOP1 LDA PMBL,Y
F518 18             CLC
F519 6501           ADC ACCA
F51B 8501           STA ACCA
F51D B98200         LDA PMBH,Y
F520 6502           ADC ACCA+1
F522 8502           STA ACCA+1
F524 9003           BCC PNEXT
F526 E600           INC SGNA
F528 18             CLC
F529 88      PNEXT  DEY
F52A C60A           DEC BUF1
F52C 10E7           BPL PLOOP1
F52E              ;
```

```
F52E A003          LDY #$3        ;ANS=(1/8)ANS
F530 4600   FLOOP2 LSR SGNA
F532 6602          ROR ACCA+1
F534 6601          ROR ACCA
F536 88            DEY
F537 D0F7          BNE FLOOP2
F539        ;
F539 A501          LDA ACCA
F53B 9562          STA FAVM,X
F53D A502          LDA ACCA+1
F53F 9563          STA FAVM+1,X
F541 60            RTS
F542        ;
F542        ;
F542        ;
F542        ; ************************
F542        ; * T-ESTMATE CALCULATION *
F542        ; ************************
F542        ;
F542        ;
F542 B562   TECALC LDA FAVM,X
F544 8507          STA ANS
F546 B563          LDA FAVM+1,X
F548 8508          STA ANS+1
F54A B534          LDA VMST1,X
F54C 8504          STA ACCB
F54E        ;
F54E 2086F6        JSR DIV16
F551        ;
F551 A507          LDA ANS
F553 951E          STA TEMST,X
F555 A508          LDA ANS+1
F557 951F          STA TEMST+1,X
F559 60            RTS
F55A        ;
F55A        ;
F55A        ; ***************************
F55A        ; * TMAX & TMIN CALCULATION *
F55A        ; ***************************
F55A        ;
F55A        ;
F55A B51F   TRCALC LDA TEMST+1,X  ;TE*(1/2)
F55C 4A            LSR A
F55D 9517          STA HALFTM+1,X
F55F B51E          LDA TEMST,X
F561 6A            ROR A
F562 9516          STA HALFTM,X
F564 8501          STA ACCA
F566        ;
F566 B509          LDA ALOWID,X
F568 4A            LSR A
F569 A8            TAY            ;(ALOWID)/2 to Y
F56A B906F0        LDA DEVI,Y
F56D 8504          STA ACCB       ;put Div. const
F56F 203DF6        JSR MULT             to ACCB
F572        ;
F572 A007          LDY #$7        ;A=ANS/128
F574 A507          LDA ANS
F576 4608   TRSHFT LSR ANS+1
F578 6A            ROR A
F579 88            DEY
```

```
F57A DOFA           BNE TRSHFT
F57C            ;
F57C 9512           STA TRM,X
F57E A900           LDA #$0
F580 9513           STA TRM+1,X
F582            ;
F582 B51E           LDA TEMST,X    ;CALC TMIN
F584 38             SEC
F585 F512           SBC TRM,X
F587 951A           STA TMMIN,X
F589 B51F           LDA TEMST+1,X
F58B E900           SBC #$0
F58D 951B           STA TMMIN+1,X
F58F 60             RTS
F590            ;
F590            ;
F590            ;
F590            ; **********************
F590            ; * F-SLV AVERAGE CALC *
F590            ; **********************
F590            ;
F590            ;  RETURN WITH F-AV IN 'A'
F590            ;
F590 A900       FAVCLC LDA #$0
F592 8501           STA ACCA
F594 8502           STA ACCA+1
F596 A003           LDY #3
F598 845F           STY BUF2
F59A A43E           LDY SPTR
F59C            ;
F59C C8         FAV1    INY
F59D C010           CPY #$10
F59F D002           BNE *+4
F5A1 A000           LDY #0
F5A3 18             CLC
F5A4 B9E600         LDA FSBUF,Y
F5A7 6501           ADC ACCA
F5A9 8501           STA ACCA
F5AB 9002           BCC FAV2
F5AD E602           INC ACCA+1
F5AF C65F       FAV2    DEC BUF2       ;<<*+2>>
F5B1 10E9           BPL FAV1
F5B3            ;
F5B3 A501           LDA ACCA
F5B5 A002           LDY #$2
F5B7 4602       FAV3    LSR ACCA+1
F5B9 6A             ROR A
F5BA 88             DEY
F5BB DOFA           BNE FAV3
F5BD 6900           ADC #0        ;round
F5BF 60             RTS
F5C0            ;
F5C0 FF             .BYTE $FF
F5C1 FF             .BYTE $FF,$FF,$FF
F5C2 FF
F5C3 FF
F5C4 FF             .BYTE $FF,$FF,$FF
F5C5 FF
F5C6 FF
F5C7 FF             .BYTE $FF,$FF,$FF
F5C8 FF
```

```
1148 F5CA FF              .BYTE $FF,$FF,$FF
1148 F5CB FF
1148 F5CC FF
1149 F5CD            ;

1150 F5CD            .FILE 'SUB-5-R3 ROM'
1153 F5CD            ;
1154 F5CD            ; *******************
1155 F5CD            ; * ARITHMETIC UNITS *
1156 F5CD            ; *    ADD8 , ADD16    *
1157 F5CD            ; *    SUB8 , SUB16    *
1158 F5CD            ; *    MULT , DIV16    *
1159 F5CD            ; *******************
1160 F5CD            ;
1161 F5CD            ;
1162 F5CD            ;
1163 F5CD            ; ********
1164 F5CD            ; * SUB8 *
1165 F5CD            ; ********
1166 F5CD            ;
1167 F5CD A503       SUB8    LDA SGNB
1168 F5CF 49FF               EOR #$FF
1169 F5D1 8503               STA SGNB
1170 F5D3            ;
1171 F5D3            ; ********
1172 F5D3            ; * ADD8 *
1173 F5D3            ; ********
1174 F5D3            ;
1175 F5D3 A500       ADD8    LDA SGNA
1176 F5D5 8506               STA SGNS
1177 F5D7 C503               CMP SGNB
1178 F5D9 D008               BNE NEQS8
1179 F5DB            ;
1180 F5DB 18                 CLC
1181 F5DC A501               LDA ACCA
1182 F5DE 6504               ADC ACCB
1183 F5E0 8507               STA ANS
1184 F5E2 60                 RTS
1185 F5E3            ;
1186 F5E3 38         NEQS8   SEC
1187 F5E4 A501               LDA ACCA
1188 F5E6 E504               SBC ACCB
1189 F5E8 B00C               BCS ADRTS
1190 F5EA 48                 PHA
1191 F5EB A506               LDA SGNS
1192 F5ED 49FF               EOR #$FF
1193 F5EF 8506               STA SGNS
1194 F5F1 68                 PLA
1195 F5F2 49FF               EOR #$FF
1196 F5F4 6901               ADC #$1
1197 F5F6 8507       ADRTS   STA ANS
1198 F5F8 18                 CLC
1199 F5F9 60                 RTS
1200 F5FA            ;
1201 F5FA            ;
1202 F5FA            ;
1203 F5FA            ; *********
1204 F5FA            ; * SUB16 *
1205 F5FA            ; *********
1206 F5FA            ;
```

```
F5FA A503   SUB16  LDA SGNB
F5FC 49FF          EOR #$FF
F5FE 8503          STA SGNB
F600               ;
F600               ; *********
F600               ; * ADD16 *
F600               ; *********
F600               ;
F600 A500   ADD16  LDA SGNA
F602 8506          STA SGNS
F604               ;
F604 C503          CMP SGNB
F606 D00E          BNE NEQS16
F608               ;
F608 18            CLC
F609 A501          LDA ACCA
F60B 6504          ADC ACCB
F60D 8507          STA ANS
F60F A502          LDA ACCA+1
F611 6505          ADC ACCB+1
F613 8508          STA ANS+1
F615 60            RTS
F616               ;
F616 38     NEQS16 SEC
F617 A501          LDA ACCA
F619 E504          SBC ACCB
F61B 8507          STA ANS
F61D A502          LDA ACCA+1
F61F E505          SBC ACCB+1
F621 8508          STA ANS+1
F623               ;
F623 B016          BCS RTSA16
F625               ;
F625 A506          LDA SGNS
F627 49FF          EOR #$FF
F629 8506          STA SGNS
F62B A507          LDA ANS
F62D 49FF          EOR #$FF
F62F 6901          ADC #$1
F631 8507          STA ANS
F633 A508          LDA ANS+1
F635 49FF          EOR #$FF
F637 6900          ADC #$0
F639 8508          STA ANS+1
F63B 18     RTSA16 CLC
F63C 60            RTS
F63D               ;
F63D               ;
F63D               ;
F63D               ; ******************
F63D               ; * MULTIPLICATION *
F63D               ; ******************
F63D               ;
F63D               ;
F63D 98     MULT   TYA
F63E 48            PHA
F63F A500          LDA SGNA
F641 4503          EOR SGNB
F643 8506          STA SGNS
F645               ;
F645 A900   MULTAB LDA #$0
F647 8508          STA ANS+1
```

```
F649 A008          LDY #$8
F64B 0A     MUL1   ASL A
F64C 2608          ROL ANS+1
F64E 0604          ASL ACCB
F650 9007          BCC MUL2
F652 18            CLC
F653 6501          ADC ACCA
F655 9002          BCC MUL2
F657 E608          INC ANS+1
F659 88     MUL2   DEY
F65A D0EF          BNE MUL1
F65C 8507          STA ANS
F65E 68            PLA
F65F A8            TAY
F660 60            RTS
F661        ;
F661        ;
F661        ; **************
F661        ; * DIVISION-8 *
F661        ; **************
F661        ;
F661        ;
F661 38     DIV8   SEC
F662 A504          LDA ACCB
F664 F01F          BEQ RTSDIV
F666                         ;
F666 A506          LDA SGNS
F668 4503          EOR SGNB
F66A 8506          STA SGNS
F66C                         ;
F66C 98            TYA
F66D 48            PHA
F66E        ;
F66E A008          LDY #8
F670 A508          LDA ANS+1
F672 0607   DV1    ASL ANS
F674 2A            ROL A
F675 C504          CMP ACCB
F677 9004          BCC DV2
F679 E504          SBC ACCB        ;answer is
F67B E607          INC ANS         ;    in ANSL
F67D 88     DV2    DEY
F67E D0F2          BNE DV1
F680 8505          STA ACCB+1      ;remainder is
F682        ;                       ;    in ACCBH
F682 68            PLA
F683 A8            TAY
F684 18            CLC             ;return with
F685 60     RTSDIV RTS             ;       "C"=0
F686        ;
F686        ;
F686        ; ***************
F686        ; * DIVISION-16 *
F686        ; ***************
F686        ;
F686        ;
F686 38     DIV16  SEC
F687 A504          LDA ACCB
F689 F0FA          BEQ RTSDIV     ;IF DIVISOR=0
F68B        ;                     ;    THEN
F68B A503          LDA SGNB       ;  RETERN WITH
```

```
F68D 4506           EOR SGNS      ;     C='1'
F68F 8506           STA SGNS
F691          ;
F691 98             TYA
F692 48             PHA
F693          ;
F693 A010           LDY #$10
F695 A900           LDA #$0
F697          ;
F697 0607     DV3   ASL ANS
F699 2608           ROL ANS+1
F69B 2A             ROL A
F69C B004           BCS DV4
F69E C504           CMP ACCB
F6A0 9004           BCC DV5       ;ANSER IS
F6A2 E504     DV4   SBC ACCB      ;     IN ANS
F6A4 E607           INC ANS
F6A6 88       DV5   DEY
F6A7 D0EE           BNE DV3       ;REMAINDER IS
F6A9 8505           STA ACCB+1    ;     IN ACCB+1
F6AB          ;
F6AB 68             PLA
F6AC A8             TAY
F6AD 18             CLC
F6AE 60             RTS
F6AF          ;
F6AF FF             .BYTE $FF,$FF,$FF
F6B0 FF
F6B1 FF
F6B2 FF             .BYTE $FF,$FF,$FF
F6B3 FF
F6B4 FF
F6B5 FF             .BYTE $FF,$FF,$FF
F6B6 FF
F6B7 FF
F6B8 FF             .BYTE $FF,$FF,$FF
F6B9 FF
F6BA FF
F6BB FF             .BYTE $FF,$FF,$FF
F6BC FF
F6BD FF
F6BE FF             .BYTE $FF,$FF,$FF
F6BF FF
F6C0 FF
F6C1          ;
F6C1          ;

F6C1          .FILE 'SUB-6-R3 ROM'
F6C1          ;
F6C1          ;
F6C1          ; *******************
F6C1          ; * MASTER & SLAVE  *
F6C1          ; *    WORK ROUTINE *
F6C1          ; *******************
F6C1          ;
F6C1          ;
F6C1          ;
F6C1          ; ***************
F6C1          ; * MASTER WORK *
F6C1          ; ***************
F6C1          ;
F6C1 204EF4   MWORK1 JSR VCALC       ;ENTER WITH X='0'
```

```
F6C4 9044          BCC NXTMWK    ;         & C='0'
F6C6              ;
F6C6 208CF4 MWRK11 JSR VCALC1    ;SAME ABOVE
F6C9 903F          BCC NXTMWK
F6CB              ;
F6CB 20A2F4 MWRK12 JSR VCALC2    ;SAME ABOVE
F6CE 903A          BCC NXTMWK
F6D0              ;
F6D0              ;   *********
F6D0              ;
F6D0 B544   MWORK2 LDA DRMNEF,X  ;IF DRAM BE NO-EFFECT
F6D2 D005          BNE MWK21     ; THEN SKIP 'PCALC'
F6D4 D654          DEC INICNT,X
F6D6 20CAF4        JSR PCALC
F6D9              ;
F6D9 A558   MWK21  LDA MREADY
F6DB D008          BNE SETW3
F6DD              ;
F6DD B554          LDA INICNT,X
F6DF 3004          BMI SETW3
F6E1              ;
F6E1 A944          LDA #MWORK6-MWORK2
F6E3 D022          BNE MWK5
F6E5              ;
F6E5 A919   SETW3  LDA #MWORK3-MWORK2
F6E7 D01E          BNE MWK5
F6E9              ;
F6E9              ;
F6E9              ;   *********
F6E9              ;
F6E9 2000F5 MWORK3 JSR PAVRG
F6EC A907          LDA #MWORK4-MWORK3
F6EE D017          BNE MWK5
F6F0              ;
F6F0              ;  **********
F6F0              ;
F6F0 2042F5 MWORK4 JSR TECALC
F6F3 A907          LDA #MWORK5-MWORK4
F6F5 D010          BNE MWK5
F6F7              ;
F6F7              ;  **********
F6F7              ;
F6F7 205AF5 MWORK5 JSR TRCALC
F6FA A9FF          LDA #$FF
F6FC 8558          STA MREADY
F6FE              ;
F6FE A55A          LDA SMODE
F700 D003          BNE *+5
F702 2031F8        JSR START
F705              ;
F705 A91D          LDA #MWORK6-MWORK5  ;< *+5 >
F707 18     MWK5   CLC
F708 9002          BCC INCMWK
F70A              ;
F70A              ;  **********
F70A              ;
F70A A905   NXTMWK LDA #5        ;ENTER WITH
F70C 6566   INCMWK ADC MSTWRK    ;    'C'=0
F70E 8566          STA MSTWRK
F710 9002          BCC MWORK6
F712 E667          INC MSTWRK+1
F714              ;
```

```
F714           ; **********
F714           ;
F714 A202      MWORK6 LDX #$2
F716 6C6800           JMP (SLVWRK)
F719           ;
F719           ; **********
F719           ;
F719           ; **************
F719           ; * SLAVE WORK *
F719           ; **************
F719           ;
F719 204EF4    SWORK1 JSR VCALC      ;ENTER WITH X='2'
F71C 905D             BCC NXTSLV    ;RETURN WITH C='0'
F71E           ;
F71E 208CF4           JSR VCALC1    ;SAME ABOVE
F721 9058             BCC NXTSLV
F723           ;
F723 20A2F4           JSR VCALC2    ;SAME ABOVE
F726 9053             BCC NXTSLV
F728           ;
F728           ; **********
F728           ;
F728 A555      SWORK2 LDA NOTRCK
F72A 3031             BMI SETS3+4
F72C                               ;
F72C B544             LDA DRMNEF,X ;IF DRAM BE NO-EFFECT
F72E D005             BNE SWK21     ; THEN SKIP 'PCALC'
F730 D654             DEC INICNT,X
F732 20CAF4           JSR PCALC
F735           ;
F735 A55A      SWK21  LDA SMODE
F737 3020             BMI SETS3
F739 B554             LDA INICNT,X
F73B D024             BNE SETS3+8
F73D           ;
F73D A00E             LDY #$E         ;= $F-NN
F73F A201      SWLOP1 LDX #1          ;= NN-1
F741                               ;
F741 B5A4      SWLOP2 LDA PSBL+$E,X   ;'$E'=$F-NN+1
F743 999600           STA PSBL,Y
F746 B5B8             LDA PSBH+$E,X
F748 99AA00           STA PSBH,Y
F74B           ;
F74B B5F4             LDA FSBUF+$E,X
F74D 99E600           STA FSBUF,Y
F750           ;
F750 88               DEY
F751 CA               DEX
F752 10ED             BPL SWLOP2
F754 98               TYA
F755 10E8             BPL SWLOP1
F757           ;
F757 845A             STY SMODE       ;set $FF to SMODE
F759           ;
F759 A93D      SETS3  LDA #SWORK3-SWORK2
F75B D01B             BNE SWK5
F75D           ;
F75D A944             LDA #SWORK4-SWORK2
F75F D017             BNE SWK5
F761           ;
F761 A95D             LDA #SWORK6-SWORK2
F763 D013             BNE SWK5
```

```
1504 F765             ;
1505 F765             ; **********
1506 F765             ;
1507 F765 2000F5 SWORK3 JSR PAVRG
1508 F768 A907           LDA #SWORK4-SWORK3
1509 F76A D00C           BNE SWK5
1510 F76C             ;
1511 F76C             ; **********
1512 F76C             ;
1513 F76C 2042F5 SWORK4 JSR TECALC
1514 F76F A907           LDA #SWORK5-SWORK4
1515 F771 D005           BNE SWK5
1516 F773             ;
1517 F773             ; **********
1518 F773             ;
1519 F773 205AF5 SWORK5 JSR TRCALC
1520 F776 A912           LDA #SWORK6-SWORK5
1521 F778 18     SWK5    CLC
1522 F779 9002           BCC INCSLV
1523 F77B             ;
1524 F77B             ; **********
1525 F77B             ;
1526 F77B A905   NXTSLV LDA #$5
1527 F77D 6568   INCSLV ADC SLVWRK
1528 F77F 8568          STA SLVWRK
1529 F781 9002          BCC SWORK6
1530 F783 E669          INC SLVWRK+1
1531 F785             ;
1532 F785             ; **********
1533 F785             ;
1534 F785 68     SWORK6 PLA
1535 F786 A8            TAY
1536 F787 68            PLA
1537 F788 AA            TAX
1538 F789 ADC4C0        LDA PIA1      ;CLEAR IRQA1
1539 F78C ADC5C0        LDA PIA1+1
1540 F78F 0901          ORA #%00000001
1541 F791 8DC5C0        STA PIA1+1
1542 F794 68     IRQRTN PLA              ;<LDA ABUF> for MON
1543 F795 58            CLI
1544 F796 40            RTI
1545 F797             ;
1546 F797 FF            .BYTE $FF,$FF,$FF
1546 F798 FF
1546 F799 FF
1547 F79A FF            .BYTE $FF,$FF,$FF
1547 F79B FF
1547 F79C FF
1548 F79D FF            .BYTE $FF,$FF,$FF
1548 F79E FF
1548 F79F FF
1549 F7A0 FF            .BYTE $FF,$FF,$FF
1549 F7A1 FF
1549 F7A2 FF
1550 F7A3 FF            .BYTE $FF,$FF,$FF
1550 F7A4 FF
1550 F7A5 FF
1551 F7A6 FF            .BYTE $FF,$FF,$FF
1551 F7A7 FF
1551 F7A8 FF
1552 F7A9             ;
```

```
F7A9                .FILE 'SUB-7-R3 ROM'
F7A9                ;
F7A9                ;
F7A9                ; ******************
F7A9                ; *  MODE ROUTINE  *
F7A9                ; ******************
F7A9                ;
F7A9                ;
F7A9 A55C           CHANGE LDA WATCHG
F7AB F001                  BEQ *+3
F7AD 60                    RTS
F7AE                           ;
F7AE A0FF                  LDY #$FF       ;SET WAIT-CHANGE
F7B0 845C                  STY WATCHG
F7B2                           ;
F7B2 8455                  STY NOTRCK
F7B4 A907                  LDA #7
F7B6 8557                  STA INHBTR
F7B8                           ;
F7B8 78                    SEI
F7B9 A54C                  LDA MSKMST
F7BB C901                  CMP #$1
F7BD F005                  BEQ CHNG1
F7BF 200CF2                JSR SETAM
F7C2 D003                  BNE CHNG2
F7C4                ;
F7C4 2022F2 CHNG1          JSR SETBM
F7C7                ;
F7C7 201AF9 CHNG2          JSR LAMPOF
F7CA A55A                  LDA SMODE
F7CC 3007                  BMI CHNGE1
F7CE                ;
F7CE 68                    PLA            ;POP THE STACK
F7CF 68                    PLA
F7D0 A533                  LDA FSLV       ;'FSLV' FOR FOUT
F7D2 4C3DF0                JMP INI1       ;  AND MAST-INIT
F7D5                ;
F7D5                ; **********
F7D5                ;
F7D5 2090F5 CHNGE1         JSR FAVCLC
F7D8 8531                  STA FMST
F7DA A44D                  LDY OUTMST
F7DC 99C4C0                STA PIA1,Y
F7DF                ;
F7DF A00F                  LDY #$F
F7E1 B99600 CHN1           LDA PSBL,Y     ;copy PSB to PMB
F7E4 996E00                STA PMBL,Y
F7E7 B9AA00                LDA PSBH,Y
F7EA 998200                STA PMBH,Y
F7ED 88                    DEY
F7EE 10F1                  BPL CHN1
F7F0                ;
F7F0 A53E                  LDA SPTR
F7F2 853C                  STA MPTR
F7F4 A51C                  LDA TSMIN
F7F6 851A                  STA TMMIN
F7F8 A51D                  LDA TSMIN+1
F7FA 851B                  STA TMMIN+1
F7FC A514                  LDA TRS
F7FE 8512                  STA TRM
F800 A515                  LDA TRS+1
F802 8513                  STA TRM+1
```

```
F804 A53F          LDA PRIS
F806 853D          STA PRIM
F808 A532          LDA FLGSE
F80A 8530          STA FLGME
F80C A537          LDA VSLV2
F80E 8535          STA VMST2
F810 A543          LDA BCNTS
F812 8541          STA BCNTM
F814 A50B          LDA ALOWID+2
F816 8509          STA ALOWID
F818
F818        ;
F818 A000          LDY #$0
F81A 8438          STY DFMST
F81C 8439          STY SGNDFM
F81E 845A          STY SMODE     ;CLR S-MODE
F820        ;
F820 A914          LDA #<MWORK6
F822 8566          STA MSTWRK
F824 A9F7          LDA #>MWORK6
F826 8567          STA MSTWRK+1
F828 A985          LDA #<SWORK6
F82A 8568          STA SLVWRK
F82C A9F7          LDA #>SWORK6
F82E 8569          STA SLVWRK+1
F830        ;
F830 60            RTS
F831        ;
F831 EA     START  NOP
F832 EA            NOP
F833 EA            NOP
F834 EA            NOP
F835 EA            NOP
F836 EA            NOP
F837        ;
F837 A001   START1 LDY #$01
F839 845A          STY SMODE
F83B 88            DEY
F83C 8459          STY CNTRDY
F83E 843E          STY SPTR
F840 8442          STY NECNTS
F842 843A          STY DFSLV
F844 843B          STY SGNDFS
F846 8410          STY TS
F848 8411          STY TS+1
F84A        ;
F84A A903          LDA #3        ; = NN
F84C 8556          STA INICNT+2
F84E        ;
F84E A44F          LDY OUTSLV
F850 B9C4C0        LDA PIA1,Y
F853 8533          STA FSLV
F855        ;
F855 A202          LDX #$2
F857        ;
F857 201AF9 INITRS JSR LAMPOF
F85A 08            PHP
F85B 78            SEI
F85C 204EF4        JSR VCALC
F85F 208CF4        JSR VCALC1
F862 20A2F4        JSR VCALC2
F865 B534          LDA VMST1,X
```

```
F867 9535          STA VMST2,X
F869 A94D          LDA #$4D      ;$514D FOR
F86B 9562          STA PAVM,X    ;   PAV-STANDARD
F86D A951          LDA #$51
F86F 9563          STA PAVM+1,X
F871 2042F5        JSR TECALC
F874 A907          LDA #7
F876 9509          STA ALOWID,X
F878 205AF5        JSR TRCALC    ;SET TMAX &
F87B 28            PLP           ;     TMIN
F87C 60     RTS8   RTS
F87D        ;
F87D        ;  **********
F87D        ;
F87D        ;
F87D 9538   UPDWN  STA DFMST,X    ;DF  IN 'A'
F87F 98            TYA            ;M-S IN 'X'
F880 9539          STA SGNDFM,X   ;SGN IN 'Y'
F882 60            RTS
F883        ;
F883        ;
F883        ;  **********
F883        ;
F883 A560   PACH2  LDA STFLG
F885 30B3          BMI START1+3
F887 60            RTS
F888 FF            .BYTE $FF,$FF,$FF
F889 FF
F88A FF
F88B FF            .BYTE $FF,$FF,$FF
F88C FF
F88D FF
F88E FF            .BYTE $FF,$FF,$FF
F88F FF
F890 FF
F891 FF            .BYTE $FF,$FF,$FF
F892 FF
F893 FF
F894        ;
F894        ;

F894        .FILE 'IN-OUT PIA-R3 ROM'
F894        ;
F894        ;
F894        ;  ********************
F894        ;  * MODE-INPUT CHECK *
F894        ;  ********************
F894        ;
F894        ;
F894        ;
F894 A940   KBDCHK LDA #%01000000
F896                         ;
F896 AE0AF0        LDX ISOFT
F899 AC0CF0        LDY PSOFT
F89C 2CC8C0        BIT PIA2
F89F F006          BEQ SETPI
F8A1 AE0BF0        LDX ISOFT+1     ;=IHARD
F8A4 AC0DF0        LDY PSOFT+1     ;=PHARD
F8A7 865D   SETPI  STX ICNST       ;set Ctrl. Cnst.
F8A9 845E          STY PCNST
F8AB                         ;
F8AB EA            .BYTE $EA,$EA,$EA,$EA
```

```
1731 F8AC EA
1731 F8AD EA
1731 F8AE EA
1732 F8AF                          ;
1733 F8AF A920          LDA #%00100000
1734 F8B1 2CC8C0        BIT PIA2
1735 F8B4 F011          BEQ RDYCHK
1736 F8B6 A64D          LDX OUTMST
1737 F8B8 BCC2C0        LDY PIA1-2,X
1738 F8BB 300A          BMI RDYCHK
1739 F8BD A64F          LDX OUTSLV
1740 F8BF BCC2C0        LDY PIA1-2,X
1741 F8C2 1003          BPL RDYCHK
1742 F8C4 20A9F7        JSR CHANGE
1743 F8C7                          ;
1744 F8C7 A558   RDYCHK LDA MREADY
1745 F8C9 1038          BPL NOMRDY
1746 F8CB 2009F9        JSR OKMRDY
1747 F8CE                          ;
1748 F8CE ADC4C0 CHKPA1 LDA PIA1
1749 F8D1                          ;
1750 F8D1 2075F9        JSR CHKST
1751 F8D4 EA            NOP
1752 F8D5                          ;
1753 F8D5 2978          AND #%01111000
1754 F8D7 C978          CMP #%01111000
1755 F8D9 F03E          BEQ RTNKBD
1756 F8DB A200          LDX #0
1757 F8DD A002          LDY #2
1758 F8DF C960          CMP #%01100000
1759 F8E1 B013          BCS PA1CK2        ;A<$60 then M-up
1760 F8E3 A455          LDY NOTRCK        ;            down
1761 F8E5 3009          BMI PA1CK1
1762 F8E7 48            PHA
1763 F8E8 A9FF          LDA #$FF
1764 F8EA 8555          STA NOTRCK
1765 F8EC 2037F8        JSR START1
1766 F8EF 68            PLA
1767 F8F0 A202   PA1CK1 LDX #2
1768 F8F2 8657          STX INHBTR
1769 F8F4 A005          LDY #5
1770 F8F6                          ;
1771 F8F6
1772 F8F6 2928   PA1CK2 AND #%00101000
1773 F8F8 C928          CMP #%00101000
1774 F8FA 98            TYA
1775 F8FB A000          LDY #0
1776 F8FD 9001          BCC *+3
1777 F8FF 88            DEY
1778 F900 4C7DF8        JMP UPDWN
1779 F903        ;
1780 F903        ; **********
1781 F903        ;
1782 F903 A938   NOMRDY LDA #%00111000
1783 F905 A005          LDY #5
1784 F907 D015          BNE ORPIA
1785 F909                          ;
1786 F909 A9F7   OKMRDY LDA #%11110111
1787 F90B A005          LDY #5
1788 F90D D004          BNE ANDPIA
1789 F90F        ;
1790 F90F        ; ********
```

```
F90F                ;
F90F                ;
F90F A9FB    LAMPON LDA #%11111011
F911 A004           LDY #$4
F913                    ;
F913 39C4C0  ANDPIA AND PIA1,Y
F916 99C4C0         STA PIA1,Y
F919 60      RTNKBD RTS
F91A                    ;
F91A A904    LAMPOF LDA #%00000100
F91C A004           LDY #$4
F91E                    ;
F91E 19C4C0  ORPIA  ORA PIA1,Y
F921 99C4C0         STA PIA1,Y
F924 60             RTS
F925                ;
F925                ; ********
F925                ;
F925 A003    BSGON  LDY #3
F927 8A             TXA
F928 F002           BEQ *+4
F92A A007           LDY #7
F92C A9F7           LDA #%11110111 ; <<< *+4 >>>
F92E 4C13F9         JMP ANDPIA
F931                ;
F931                ;

F931                .FILE 'PATCH-R3 ROM'
F931                ;
F931                ;
F931                ;
F931 A9F7    TLMPON LDA #%11110111
F933 E000           CPX #0
F935 F002           BEQ *+4
F937 A9EF           LDA #%11101111
F939 2DC8C0         AND PIA2
F93C 8DC8C0         STA PIA2
F93F                    ;
F93F 38             SEC
F940 B541           LDA BCNTM,X
F942 60             RTS
F943                ;
F943                ;
F943 9DC9C0  TLMPOF STA PIA2+1,X
F946                    ;
F946 A908           LDA #%00001000
F948 E000           CPX #0
F94A F002           BEQ *+4
F94C A910           LDA #%00010000
F94E 0DC8C0         ORA PIA2
F951 8DC8C0         STA PIA2
F954 60             RTS
F955                ;
F955                ;
F955 B50F    INCT1  LDA TM+1,X
F957 D009           BNE INC2
F959 B50E           LDA TM,X
F95B C920           CMP #$20
F95D D003           BNE INC2
F95F 2094F1         JSR CLBLMP
F962 F60E    INC2   INC TM,X
F964 D002           BNE RTNPAC
```

```
F966 E60F                INC TM+1
F968 60          RTNPAC  RTS
F969             ;
F969             ;
F969 A44F        CHKFDA  LDY OUTSLV
F96B B9C2C0              LDA PIA1-2,Y
F96E 10F8                BPL RTNPAC
F970 68                  PLA
F971 68                  PLA
F972 4CA9F7              JMP CHANGE
F975             ;
F975             ;
F975 A8          CHKST   TAY
F976 2904                AND #%00000100
F978 D015                BNE NOSTAT
F97A A560                LDA STFLG
F97C F017                BEQ RTN10
F97E A900                LDA #0
F980 8560                STA STFLG
F982 78                  SEI
F983 48                  PHA
F984 2031F8              JSR START
F987 68                  PLA
F988 A8                  TAY
F989 A900                LDA #$00
F98B 8555                STA NOTRCK
F98D F006                BEQ RTN10
F98F A9FF        NOSTAT  LDA #$FF
F991 8560                STA STFLG
F993 8555                STA NOTRCK
F995 98          RTN10   TYA
F996 60                  RTS
F997             ;
F997             ;
F997 CD0FF0      CHKUL   CMP UPPER
F99A 9007                BCC CHKL
F99C AD0FF0              LDA UPPER
F99F A0FF                LDY #$FF
F9A1 300A                BMI RTN11
F9A3 CD0EF0      CHKL    CMP LOWER
F9A6 B005                BCS RTN11
F9A8 AD0EF0              LDA LOWER
F9AB A0FF                LDY #$FF
F9AD A60A        RTN11   LDX BUF1
F9AF C000                CPY #0
F9B1 60                  RTS
F9B2             ;
F9B2             ;
F9B2                     .END

ERRORS = 0000 <0000>

SYMBOL   VALUE

ACCA    0001  ACCB    0004  ADD16   F600
ADD8    F5D3  ADRTS   F5F6  ALOWID  0009
ANDPIA  F913  ANS     0007  BCNTM   0041
BCNTS   0043  BRAD    F31D  BRESET  F0D6
BSGON   F925  BUF1    000A  BUF2    005F
```

| | | | | | |
|---|---|---|---|---|---|
| C1 | F003 | CHANGE | F7A9 | CHKCB | F0EA |
| CHKFDA | F969 | CHKL | F9A3 | CHKPA1 | F8CE |
| CHKST | F975 | CHKT1 | F2ED | CHKTMX | F2D8 |
| CHKUL | F997 | CHN1 | F7E1 | CHNG1 | F7C4 |
| CHNG2 | F7C7 | CHNGE1 | F7D5 | CLBLMP | F194 |
| CLNCNT | F302 | CLRTM | F297 | CLRTS | F2CE |
| CMPT | F1AF | CMPTR | F127 | CNTRDY | 0059 |
| D | 0012 | D2 | 000D | DCALC1 | F387 |
| DEVI | F006 | DFC1 | F355 | DFC2 | F36D |
| DFCALC | F33B | DFMST | 0038 | DFSLV | 003A |
| DIV16 | F686 | DIV8 | F661 | DRMNEF | 0044 |
| DV1 | F672 | DV2 | F67D | DV3 | F697 |
| DV4 | F6A2 | DV5 | F6A6 | E | 000A |
| EFMCHK | F286 | FAV1 | F59C | FAV2 | F5AF |
| FAV3 | F5B7 | FAVCLC | F590 | FLGDLY | 0045 |
| FLGME | 0030 | FLGMST | 0050 | FLGRES | 0051 |
| FLGSE | 0032 | FLGSLV | 0052 | FMBUF | 00BE |
| FMST | 0031 | FNO1 | F3FB | FNOUT | F3D7 |
| FNOUT1 | F417 | FNOUT2 | F431 | FOSLV | F427 |
| FSBUF | 00E6 | FSLV | 0033 | HALFTE | F185 |
| HALFTM | 0016 | HALFTS | 0018 | HSTRT | F037 |
| ICNST | 005D | INC2 | F962 | INCALW | F174 |
| INCBC | F10F | INCMWK | F70C | INCSLV | F77D |
| INCT | F121 | INCT1 | F955 | INHBTR | 0057 |
| INI1 | F03D | INICNT | 0054 | INIMAS | F238 |
| INIPIA | F1D0 | INITRS | F857 | IRQ | F0AB |
| IRQ1 | F0D1 | IRQRTN | F794 | ISOFT | F00A |
| KBDCHK | F894 | LAMPOF | F91A | LAMPON | F90F |
| LOWER | F00E | MAIN | F077 | MPTR | 003C |
| MREADY | 0058 | MSKMST | 004C | MSKSLV | 004E |
| MSTDRM | F26F | MSTWRK | 0066 | MUL1 | F64B |
| MUL2 | F659 | MULT | F63D | MULTAB | F645 |
| MWK21 | F6D9 | MWK5 | F707 | MWORK1 | F6C1 |
| MWORK2 | F6D0 | MWORK3 | F6E9 | MWORK4 | F6F0 |
| MWORK5 | F6F7 | MWORK6 | F714 | MWRK11 | F6C6 |
| MWRK12 | F6CB | NECNTM | 0040 | NECNTS | 0042 |
| NEQS16 | F616 | NEQS8 | F5E3 | NOMRDY | F903 |
| NOSTAT | F98F | NOTRCK | 0055 | NXTMWK | F70A |
| NXTSLV | F77B | OKMRDY | F909 | ORPIA | F91E |
| OUTMST | 004D | OUTSLV | 004F | PA1CK1 | F8F0 |
| PA1CK2 | F8F6 | PACH1 | F329 | PACH2 | F883 |
| PAVM | 0062 | PAVRG | F500 | PAVS | 0064 |
| PCALC | F4CA | PCNST | 005E | PIA1 | C0C4 |
| PIA2 | C0C8 | PLOOP1 | F515 | PLOOP2 | F530 |
| PMBH | 0082 | PMBL | 006E | PNEXT | F529 |
| PRIM | 003D | PRIS | 003F | PSBH | 00AA |
| PSBL | 0096 | PSOFT | F00C | PWRUP1 | 0048 |
| PWRUP2 | 004A | RDYCHK | F8C7 | RENWV | F4FB |
| RESAB1 | F10C | RESET | F000 | RESET1 | F010 |
| RESMST | F0FA | RESRTI | F0E3 | RESSLV | F0FE |
| RLMPON | F383 | RTN | F15D | RTN10 | F995 |
| RTN11 | F9AD | RTNKBD | F919 | RTNPAC | F968 |
| RTS2 | F2A3 | RTS4 | F386 | RTS8 | F87C |
| RTSA16 | F63B | RTSDIV | F685 | SETAM | F20C |
| SETBC | 005B | SETBM | F222 | SETDFS | F3D4 |
| SETPI | F8A7 | SETS3 | F759 | SETV | F4C6 |
| SETW3 | F6E5 | SGNA | 0000 | SGNB | 0003 |
| SGND2 | 000C | SGNDFM | 0039 | SGNDFS | 003B |
| SGNS | 0006 | SLVDRM | F2A4 | SLVWRK | 0068 |
| SMODE | 005A | SPTR | 003E | START | F831 |
| START1 | F837 | STFLG | 0060 | SUB16 | F5FA |
| SUB8 | F5CD | SWK21 | F735 | SWK5 | F778 |

```
SWLOP1 F73F   SWLOP2 F741   SWORK1 F719
SWORK2 F728   SWORK3 F765   SWORK4 F76C
SWORK5 F773   SWORK6 F785   TECALC F542
TEFFCT F2F8   TEMST  001E   TESLV  0020
TLMPOF F943   TLMPON F931   TM     000E
TMBUF  0022   TMMIN  001A   TOFOUT F182
TRCALC F55A   TRCHK  F15E   TRM    0012
TRS    0014   TRSHFT F576   TS     0010
TSBUF  0024   TSMIN  001C   UPDFLG 00FA
UPDWN  F87D   UPPER  F00F   VCALC  F44E
VCALC1 F48C   VCALC2 F4A2   VCBUF  0026
VCSGN  0049   VCSUB  F4C3   VMST1  0034
VMST2  0035   VSLV1  0036   VSLV2  0037
WATCHG 005C
END OF ASSEMBLY
```

What is claimed is:

1. Apparatus for synchronizing the playback rates of a plurality of music sources comprising:

reference generating means for generating a reference signal including beats representative of a desired tempo;

first music reproducing means controllable in the playback rate for producing a music signal representative of music, wherein said music signal is recorded on either of a phonographic disk or tape in the form of analog waveforms;

first discriminating means operative in response to said music signal for extracting the beats involved in the music signal to produce a beat signal representative of the extracted beats; and control means interconnected to said reference generating means, said first music reproducing means, and said first discriminating means for determining a time difference between the occurrence of beats involved in said reference signal and the occurrence of the beat signal in order to regulate the playback rate of said first music reproducing means so as to make the time difference therebetween substantially constant;

said first music reproducing means produces said music signal with a phase difference between the beats involved in the music signal which is substantially constant with respect to the beats involved in said reference signal.

2. Apparatus in accordance with claim 1, wherein said reference generating means comprises a second music reproducing means for producing a music signal representative of music;

said apparatus further comprising a second discriminating means operative in response to said second music reproducing means for extracting beats involved in the music signal produced by said second music reproducing means and interconnected to said control means to produce the reference signal representative of the thus extracted beats.

3. Apparatus in accordance with claim 1, wherein said reference generating means comprises synthesizer means for producing a signal representative of beats as the reference signal.

4. Apparatus in accordance with claim 2, wherein said second music reproducing means comprises at least one of a phonographic disk player and a tape player.

5. Apparatus in accordance with claim 1, wherein said control means comprises:

first means for determining significant beats involved in the reference signal and the music signal;

second means operative in response to said first means for determining a first time interval between adjacent ones of the significant beats involved in the reference signal, and a second time interval between adjacent ones of the significant beats involved in the music signal; and third means operative in response to said second means for determining the time difference between first and second time intervals to produce a control signal to said music reproducing means, thereby causing the phase difference to be kept substantially constant.

6. Apparatus in accordance with claim 5, wherein said first means comprises prediction means for predicting a period of time during which significant beats are expected to be involved in the reference signal and the music signal successive to the significant beats presently involved in the reference signal and the music signal, respectively;

said first means determining the significant beats in accordance with the predicted period of time.

7. Apparatus in accordance with claim 2, further comprising switching means interconnected to both of said first and second music reproducing means for selecting either one of the music signals produced from both of said first and second music reproducing means as an ultimate output signal of said apparatus.

8. Apparatus in accordance with claim 5, wherein said third means produces the control signal for said first music reproducing means.

9. Apparatus in accordance with claim 1, wherein said control means comprises a processor system adapted to determine the time difference required to produce a control signal for regulating the playback rate of said first music reproducing means.

10. Apparatus for synchronizing playback rates of music sources comprising:

first and second music reproducing means for producing first and second music signals representative of music, respectively, at least one of said first and second music reproducing means including at least one of a phonographic disk player and a tape player which are controllable in the playback rate to produce music signals recorded in the form of analog waveforms on a phonographic disk or tape, respectively;

first and second discriminating means operative in response to the first and second music signals, respectively, for extracting beats inolved in the first and second music signals to produce first and second beat signals representative of the extracted beats, respectively; and control means interconnected to said first and second music reproducing means and said first and second discriminating means for determining the time difference between the occurrence of the first beat signal and the occurrence of the second beat signal to regulate the playback rate of said at least one of said music reproducing means so as to make the time difference substantially unchanged;

whereby said at least one of said music reproducing means produces the music signal with a phase difference between the beats involved in the music signal substantially unchanged with respect to the beats involved in the music signal produced from the other of said first and second music reproducing means.

11. Apparatus in accordance with claim 10, wherein said control means comprises:

first means for determining significant beats involved in the first and second music signals;

second means operative in response to said first means for determining a first time interval between adjacent ones of the significant beats involved in the first music signal, and a second time interval between adjacent ones of the significant beats involved in the second music signal; and third means operative in response to said second means for determining the time difference between the first and second time intervals to produce a control signal to said at least one of said music reproducing means, thereby causing the phase difference to be kept substantially unchanged.

12. Apparatus in accordance with claim 11, wherein said first means comprises prediction means for predicting a period of time during which significant beats are expected to be possibly involved in the first and second music signals successive to the significant beats presently involved in the first and second music signals, respectively;

said first means determining the significant beats in accordance with the predicted period of time.

13. Apparatus in accordance with claim 10, further comprising switching means interconnected to said first and second music reproducing means for selecting either one of the first and second music signals as an ultimate output signal of said apparatus.

14. Apparatus in accordance with claim 10, wherein said control means comprises a processor system adapted to determine the time difference to produce a control signal for regulating the playback rate of said at least one of said music reproducing means.

15. Apparatus for synchronizing the playback rates of a plurality of music sources comprising:

reference generating means for generating a reference signal including beats representative of a desired tempo;

first music reproducing means controllable in the playback rate for producing a music signal representative of music, wherein said music signal is recorded on either of a phonographic disk or tape in the form of analog waveforms and wherein said first music reproducing means produces the music signal with a phase difference between the beats involved in the music signal which is substantially constant with respect to the beats involved in the reference signal;

first discriminating means operative in response to the music signal for extracting the beats involved in the music signal to produce a beat signal representative of the extracted beats;

control means interconnected to said reference generating means, said first music reproducing means, and said first discriminating means for determining a time difference between the occurrence of beats involved in the reference signal and the occurrence of the beat signal in order to regulate the playback rate of said first music reproducing means so as to make the time difference therebetween substantially constant;

said control means including:

first means for determining significant beats involved in the reference signal and the music signal, wherein said first means comprises prediction means for predicting a period of time during which significant beats are expected to be possibly involved in the reference signal and the music signal successive to the significant beats presently involved in the reference signal and the music signal, respectively, said first means determining the significant beats in accordance with the predicted period of time, second means operative in response to said first means for determining a first time interval between adjacent ones of the significant beats involved in the music signal, and third means operative in response to said second means for determining the time difference from first and second time intervals to produce a control signal to said music reproducing means, thereby causing the phase difference to be kept substantially constant.

16. Apparatus in accordance with 15, wherein said reference generating means comprises a second music reproducing means for producing a music signal representative of music;

said apparatus further comprising a second discriminating means operative in response to said second music reproducing means for extracting beats involved in the music signal produced by said second music reproducing means and interconnected to said control means to produce the reference signal representative of the thus extracted beats.

17. Apparatus in accordance with claim 15, wherein said reference generating means comprises synthesizer means for producing a signal representative of beats as the reference signal.

18. Apparatus in accordance with claim 16, wherein said second music reproducing means comprises at least one of a phonographic disk player and a tape player.

19. Apparatus in accordance with claim 16, further comprising switching means interconnected to both of said first and second music reproducing means for selecting either one of the music signals produced from both of said first and second music reproducing means as an ultimate output signal of said apparatus.

20. Apparatus in accordance with claim 19, wherein said third means produces the control signal for said first music reproducing means.

21. Apparatus in accordance with claim 15, wherein said control means comprises a processor system adapted to determine the time difference required to produce a control signal for regulating the playback rate of said first music reproducing means.

22. Apparatus for synchronizing playback rates of music sources comprising:

first and second music reproducing means for producing first and second music signals representative of music, respectively, at least one of said first and second music reproducing means including at least one of a phonographic disk player and a tape player which are controllable in playback rate to produce music signals recorded in the form of analog waveforms on a phonographic or disk tape, respectively;

first and second discriminating means operative in response to the first and second music signals, respectively, for extracting beats involved in the first and second music signals to produce first and second beat signals representative of the extracted beats, respectively; and control means interconnected to said first and second discriminating means for determining the time difference between the occurrence of the first beat signal and the occurrence of the second beat signal to regulate the playback rate of said at least one of said music reproducing means so as to make the time difference substantially unchanged, wherein said at least one of said music reproducing means produces the music signal with a phase difference between the beats involved in the music signal produced from the other of said first and second music reproducing means;

said control means including:

first means for determining significant beats involved in the first and second music signals, wherein said first means comprises prediction means for predicting a period of time during which significant beats are expected to be possibly involved in the first and second music signals successive to the significant beats presently involved in the first and second music signals respectively, and wherein said first means is for determining the significant beats in accordance with the predicted period of time, second means operative in response to said first means for determining a first time interval between adjacent ones of the significant beats involved in the first music signal, and a second time interval between adjacent ones of the significant beats involved in the second music signal, and third means operative in response to said second means for determining the time difference between first and second time intervals to produce a control signal to said at least one of said music reproducing means, thereby causing the phase difference to be substantially unchanged.

23. Apparatus in accordance with claim 22, further comprising switching means interconnected to said first and second music reproducing means for selecting either one of the first and second music signals as an ultimate output signal of said apparatus.

24. Apparatus in accordance with claim 22, wherein said control means comprises a processor system adapated to determine the time difference to produce a control signal for regulating the playback rate of said at least one of said music reproducing means.

* * * * *